(12) United States Patent
Satoh et al.

(10) Patent No.: US 11,554,443 B2
(45) Date of Patent: Jan. 17, 2023

(54) METHODS FOR PRODUCING FORGED PRODUCTS AND OTHER WORKED PRODUCTS

(71) Applicant: Arconic Inc., Pittsburgh, PA (US)

(72) Inventors: Gen Satoh, Murrysville, PA (US); Daniel M. Myers, New Kensington, PA (US); Brandon H. Bodily, Broadview Heights, OH (US)

(73) Assignee: Howmet Aerospace Inc., Pittsburgh, PA (US)

( * ) Notice: Subject to any disclaimer, the term of this patent is extended or adjusted under 35 U.S.C. 154(b) by 912 days.

(21) Appl. No.: 15/406,306

(22) Filed: Jan. 13, 2017

(65) Prior Publication Data

US 2017/0203386 A1    Jul. 20, 2017

Related U.S. Application Data

(60) Provisional application No. 62/278,753, filed on Jan. 14, 2016.

(51) Int. Cl.
*B23K 26/00* (2014.01)
*B23K 15/00* (2006.01)
*B23K 15/08* (2006.01)
*B23K 26/352* (2014.01)
*B21J 5/00* (2006.01)
(Continued)

(52) U.S. Cl.
CPC ........... *B23K 26/0093* (2013.01); *B21J 5/002* (2013.01); *B23K 15/0086* (2013.01); *B23K 15/0093* (2013.01); *B23K 15/08* (2013.01); *B23K 26/342* (2015.10); *B23K 26/354* (2015.10); *B23K 26/3576* (2018.08); *B23K 26/36* (2013.01);
(Continued)

(58) Field of Classification Search
CPC ............. B23K 26/0093; B23K 26/342; B23K 26/354; B23K 26/361; B23K 26/3576; B23K 15/0086; B23K 15/0093; B23K 15/08; B23K 26/36; B33Y 40/00; B21J 5/002
USPC ........................................................ 219/76.1
See application file for complete search history.

(56) References Cited

U.S. PATENT DOCUMENTS

| | | | | |
|---|---|---|---|---|
| 4,055,975 A | * | 11/1977 | Serfozo ..................... | B21J 3/00 72/42 |
| 4,294,615 A | * | 10/1981 | Blackburn .............. | C22C 14/00 420/420 |

(Continued)

FOREIGN PATENT DOCUMENTS

| | | |
|---|---|---|
| CN | 1861296 A | 11/2006 |
| EP | 1952932 | 8/2008 |

(Continued)

OTHER PUBLICATIONS

Bass, B. S., "Validating the Arcam EBM Process as an Alternative Fabrication Method for Titanium-6Al—4V Alloys", pp. 1-51, Thesis, Dept. of Materials Science and Engineering, North Carolina State University, Raleigh, North Carolina, 2007.

(Continued)

*Primary Examiner* — Eric S Stapleton
(74) *Attorney, Agent, or Firm* — Greenberg Traurig, LLP

(57) ABSTRACT

The present disclosure is directed towards different embodiments of additively manufacturing and smoothing an AM preform to configure an AM preform for downstream processing (working, forging, and the like).

19 Claims, 18 Drawing Sheets

(51) Int. Cl.
- *B23K 26/361* (2014.01)
- *B33Y 10/00* (2015.01)
- *B23K 26/342* (2014.01)
- *B23K 26/354* (2014.01)
- *B23K 26/36* (2014.01)
- *B23K 103/14* (2006.01)

(52) U.S. Cl.
CPC ............ *B23K 26/361* (2015.10); *B33Y 10/00* (2014.12); *B23K 2103/14* (2018.08)

(56) References Cited

U.S. PATENT DOCUMENTS

| | | | | |
|---|---|---|---|---|
| 4,735,867 | A * | 4/1988 | Finnegan | B23K 35/286 148/437 |
| 4,839,245 | A * | 6/1989 | Sue | C23C 14/0021 29/DIG. 45 |
| 5,059,256 | A * | 10/1991 | Kanapenas | B01D 29/111 219/121.71 |
| 5,059,359 | A * | 10/1991 | Hull | G01J 1/4257 264/401 |
| 5,118,363 | A * | 6/1992 | Chakrabarti | C22F 1/183 148/421 |
| 5,622,216 | A * | 4/1997 | Brown | B22D 11/00 164/71.1 |
| 5,810,949 | A * | 9/1998 | Chakrabarti | C22C 1/02 148/535 |
| 5,902,441 | A * | 5/1999 | Bredt | B28B 1/00 156/284 |
| 6,127,044 | A * | 10/2000 | Yamamoto | B21K 3/04 148/669 |
| 6,193,923 | B1 * | 2/2001 | Leyden | B29C 41/12 264/401 |
| 6,280,543 | B1 * | 8/2001 | Zonker | C22C 21/00 148/551 |
| 6,519,500 | B1 * | 2/2003 | White | G05B 19/00 700/119 |
| 6,589,721 | B1 * | 7/2003 | Arcus | G03C 7/30 430/435 |
| 6,858,059 | B2 * | 2/2005 | Yamamoto | C22B 9/228 75/10.65 |
| 7,087,109 | B2 * | 8/2006 | Bredt | C04B 28/14 106/691 |
| 7,592,563 | B2 * | 9/2009 | Wissenbach | B24B 1/00 219/121.17 |
| 8,017,070 | B2 * | 9/2011 | Low | B22F 3/1055 419/26 |
| 8,240,046 | B2 * | 8/2012 | Peretti | B23K 9/04 29/889.71 |
| 8,367,962 | B2 * | 2/2013 | Zaffino | B23K 9/044 219/76.1 |
| 8,394,168 | B2 * | 3/2013 | Withers | B22F 3/008 75/10.18 |
| 8,471,168 | B2 * | 6/2013 | Ganesh | B23K 9/04 219/73 |
| 9,056,584 | B2 * | 6/2015 | Fish, Jr. | B60R 1/025 |
| 9,296,036 | B2 | 3/2016 | Bush et al. | |
| 9,662,745 | B2 * | 5/2017 | Yao | B23K 1/0008 |
| 2001/0043990 | A1 * | 11/2001 | Chong | B05D 7/02 427/320 |
| 2002/0106418 | A1 * | 8/2002 | Fukushima | B23K 26/08 425/467 |
| 2003/0150532 | A1 * | 8/2003 | Marois | B21C 23/085 148/521 |
| 2004/0002023 | A1 * | 1/2004 | Sowinski | G03C 7/3041 430/505 |
| 2004/0084118 | A1 * | 5/2004 | Raymond | B21J 1/06 148/676 |
| 2004/0173335 | A1 * | 9/2004 | Schaffer | B22F 3/26 164/98 |
| 2004/0182202 | A1 * | 9/2004 | Geving | C22C 33/02 75/252 |
| 2004/0244887 | A1 * | 12/2004 | Fukai | B21J 1/04 148/670 |
| 2005/0000677 | A1 * | 1/2005 | Kolek | B22D 11/003 164/475 |
| 2005/0150878 | A1 * | 7/2005 | Thomas | B23K 26/03 219/121.68 |
| 2005/0161189 | A1 * | 7/2005 | Sercombe | B22F 3/1055 164/97 |
| 2005/0173838 | A1 * | 8/2005 | Priedeman | B29C 71/0009 264/401 |
| 2005/0183802 | A1 * | 8/2005 | Catteau | C22F 1/04 148/698 |
| 2005/0199032 | A1 * | 9/2005 | Krajewski | B21D 22/022 72/379.2 |
| 2005/0241147 | A1 * | 11/2005 | Arnold | B23P 6/007 29/889.1 |
| 2006/0065330 | A1 * | 3/2006 | Cooper | B22F 3/1112 148/538 |
| 2006/0078728 | A1 * | 4/2006 | Kilmer | B23K 1/19 428/342 |
| 2006/0107718 | A1 * | 5/2006 | James | B21K 21/16 72/208 |
| 2006/0177284 | A1 * | 8/2006 | Keener | F16B 33/06 411/501 |
| 2007/0000885 | A1 * | 1/2007 | Thomas | B08B 7/0042 219/121.68 |
| 2007/0023975 | A1 * | 2/2007 | Buckley | B29B 11/16 264/494 |
| 2007/0089815 | A1 * | 4/2007 | Wickersham | B21B 1/02 148/668 |
| 2007/0118243 | A1 * | 5/2007 | Schroeder | G16H 50/50 700/118 |
| 2007/0128463 | A1 * | 6/2007 | Dixon | B21C 23/08 428/654 |
| 2007/0160476 | A1 * | 7/2007 | Cheng | B23P 6/007 416/193 A |
| 2007/0163113 | A1 * | 7/2007 | Cheng | B23P 6/007 29/889.1 |
| 2007/0163115 | A1 * | 7/2007 | Cheng | B23P 6/007 29/889.2 |
| 2007/0183918 | A1 * | 8/2007 | Monsheimer | B28B 1/001 419/1 |
| 2007/0246137 | A1 * | 10/2007 | Lequeu | C22C 21/12 148/693 |
| 2007/0286958 | A1 * | 12/2007 | Slaughter | B23K 15/08 427/375 |
| 2008/0011816 | A1 * | 1/2008 | Kilmer | B23K 35/002 228/262.51 |
| 2008/0118665 | A1 * | 5/2008 | Slaughter | B22F 3/1055 427/595 |
| 2008/0274367 | A1 * | 11/2008 | Kilmer | B23K 35/0238 428/607 |
| 2008/0302454 | A1 * | 12/2008 | Kajihara | C22C 21/00 148/692 |
| 2009/0007933 | A1 * | 1/2009 | Thomas | B08B 7/0042 134/1 |
| 2009/0033003 | A1 * | 2/2009 | Sievers | B22F 3/1055 264/497 |
| 2009/0053099 | A1 * | 2/2009 | Kajihara | C22C 21/00 420/535 |
| 2009/0121393 | A1 * | 5/2009 | Abe | B22F 3/1055 264/497 |
| 2009/0139291 | A1 * | 6/2009 | Mikkola | B21C 47/28 72/47 |
| 2009/0151147 | A1 * | 6/2009 | Bialas | B23K 26/16 29/557 |
| 2010/0242843 | A1 * | 9/2010 | Peretti | B22F 5/04 118/723 E |
| 2010/0279007 | A1 * | 11/2010 | Briselden | B22F 3/008 427/243 |
| 2010/0291401 | A1 * | 11/2010 | Medina | B23K 15/0086 428/593 |
| 2011/0042859 | A1 * | 2/2011 | Patel | B33Y 70/00 264/401 |
| 2011/0097213 | A1 * | 4/2011 | Peretti | B23P 15/04 416/241 A |

(56) References Cited

U.S. PATENT DOCUMENTS

| | | | | |
|---|---|---|---|---|
| 2011/0135952 | A1* | 6/2011 | Morris | B22F 3/1055 428/548 |
| 2011/0183030 | A1* | 7/2011 | Belzile | B29C 45/27 425/547 |
| 2011/0241947 | A1* | 10/2011 | Scott | B22F 3/1055 343/700 MS |
| 2011/0290364 | A1* | 12/2011 | Biris | B21C 23/002 138/140 |
| 2012/0042995 | A1* | 2/2012 | Kropfl | B21B 3/00 148/695 |
| 2012/0183410 | A1* | 7/2012 | Imano | F01D 5/14 416/241 R |
| 2012/0195994 | A1* | 8/2012 | El-Siblani | B33Y 10/00 425/174.4 |
| 2012/0227453 | A1* | 9/2012 | Li | B21B 1/227 72/46 |
| 2013/0025338 | A1* | 1/2013 | Vohskaemper | B21J 5/002 72/42 |
| 2013/0039799 | A1* | 2/2013 | Bono | B60J 7/202 419/38 |
| 2013/0071562 | A1* | 3/2013 | Szuromi | B22F 3/1055 427/237 |
| 2013/0098575 | A1 | 4/2013 | Di Serio et al. | |
| 2013/0189458 | A1* | 7/2013 | Andre | B23P 13/00 428/34.1 |
| 2013/0217838 | A1* | 8/2013 | DeFelice | B29C 67/04 525/471 |
| 2013/0330470 | A1* | 12/2013 | Gersch | B05D 1/12 427/180 |
| 2014/0034626 | A1* | 2/2014 | Illston | B22F 3/1055 219/121.78 |
| 2014/0161618 | A1* | 6/2014 | Walker | B23K 15/0006 416/223 A |
| 2014/0202595 | A1* | 7/2014 | Hofmann | B22D 23/003 148/522 |
| 2014/0230974 | A1* | 8/2014 | Lin | C22F 1/047 148/695 |
| 2014/0252685 | A1* | 9/2014 | Stucker | B29C 64/20 264/401 |
| 2014/0255666 | A1* | 9/2014 | Stucker | B29C 64/165 428/201 |
| 2014/0265048 | A1* | 9/2014 | Burris | B23K 26/034 264/497 |
| 2014/0295087 | A1* | 10/2014 | Rickenbacher | B22F 3/1055 427/383.1 |
| 2015/0001093 | A1* | 1/2015 | Carter | B23H 9/14 205/640 |
| 2015/0013144 | A1* | 1/2015 | Bush | C22F 1/183 29/527.1 |
| 2015/0017475 | A1* | 1/2015 | Ward-Close | B22F 3/1035 428/660 |
| 2015/0034604 | A1* | 2/2015 | Subramanian | B22F 7/02 219/73.21 |
| 2015/0037498 | A1* | 2/2015 | Bruck | B05D 3/0254 427/229 |
| 2015/0041025 | A1* | 2/2015 | Wescott | B23K 9/042 148/538 |
| 2015/0048553 | A1* | 2/2015 | Dietrich | B33Y 10/00 264/401 |
| 2015/0080495 | A1* | 3/2015 | Heikkila | B33Y 10/00 523/223 |
| 2015/0125333 | A1* | 5/2015 | Bruck | B23K 26/127 419/1 |
| 2015/0125335 | A1* | 5/2015 | Bruck | B23K 26/127 419/26 |
| 2015/0132173 | A1* | 5/2015 | Bruck | B23K 26/702 419/1 |
| 2015/0224603 | A1* | 8/2015 | Bruck | B23P 6/00 442/228 |
| 2015/0224607 | A1* | 8/2015 | Bruck | B23K 26/342 219/73.21 |
| 2015/0266081 | A1* | 9/2015 | Chen | B21D 53/86 29/897.2 |
| 2015/0273622 | A1* | 10/2015 | Manabe | B23K 15/0086 219/76.1 |
| 2015/0273631 | A1* | 10/2015 | Kenney | B22F 3/1055 419/53 |
| 2015/0283614 | A1* | 10/2015 | Wu | B22F 3/1055 419/42 |
| 2015/0283751 | A1* | 10/2015 | O'Neil | B22D 23/003 264/308 |
| 2015/0306666 | A1* | 10/2015 | Honda | B22F 3/1055 425/78 |
| 2015/0335434 | A1* | 11/2015 | Patterson | A61F 2/30767 623/23.5 |
| 2015/0336219 | A1* | 11/2015 | Bruck | B23K 9/042 427/142 |
| 2015/0360287 | A1* | 12/2015 | Zink | B22F 3/1055 419/28 |
| 2015/0367415 | A1* | 12/2015 | Buller | B23K 26/346 419/53 |
| 2015/0375359 | A1* | 12/2015 | Cui | B24B 1/005 451/59 |
| 2016/0045982 | A1* | 2/2016 | Stoodt | B23K 26/0869 29/889.1 |
| 2016/0052057 | A1* | 2/2016 | Xu | F01D 5/187 419/5 |
| 2016/0067923 | A1* | 3/2016 | James | B29C 64/153 264/497 |
| 2016/0136759 | A1* | 5/2016 | Broda | B22F 3/1055 219/76.1 |
| 2016/0158889 | A1* | 6/2016 | Carter | G02B 6/4268 219/76.12 |
| 2016/0184925 | A1* | 6/2016 | Huang | B23K 26/342 419/53 |
| 2016/0207263 | A1* | 7/2016 | Gordon | B33Y 30/00 |
| 2016/0228950 | A1* | 8/2016 | Bodily | B22F 3/24 |
| 2016/0298218 | A1* | 10/2016 | Kilmer | C22C 21/08 |
| 2017/0014937 | A1* | 1/2017 | Wilhelmy | B23K 35/365 |
| 2017/0120386 | A1 | 5/2017 | Lin et al. | |
| 2017/0120393 | A1* | 5/2017 | Lin | B22F 3/1055 |
| 2017/0203355 | A1* | 7/2017 | Satoh | B23K 15/0086 |

FOREIGN PATENT DOCUMENTS

| | | |
|---|---|---|
| EP | 2112242 | 10/2009 |
| EP | 2113583 | 11/2009 |
| EP | 2551040 | 1/2013 |
| EP | 2698216 | 12/2014 |
| FR | 2902356 | 12/2007 |
| GB | 1517283 | 7/1978 |
| WO | WO2007/048250 | 5/2007 |
| WO | WO2007/111634 | 10/2007 |
| WO | WO2010/049696 | 5/2010 |
| WO | WO2012/065729 | 5/2012 |
| WO | WO2012/112779 | 8/2012 |
| WO | WO2013/087515 | 6/2013 |
| WO | WO2013/133978 | 9/2013 |
| WO | 2014/160695 A1 | 10/2014 |
| WO | WO2014/160695 | 10/2014 |
| WO | 2017/123995 A1 | 7/2017 |

OTHER PUBLICATIONS

Boyer, R. R., "Titanium and Titanium Alloys", *Metals Handbook Ninth Edition, vol. 9 Metallography and Microstructures*, ASM, Metals Park, Ohio, pp. 458-475, Dec. 1985.

Brice, C. A., et al., "Additive Manufacturing Workshop," presented at the Commonwealth Scientific and Industrial Research Organisation, Melbourne, Australia, Jun. 27, 2011.

Cowles, B. A., "High cycle fatigue in aircraft gas turbines—an industry perspective" *International Journal of Fracture* 80:147-168 (1996).

Debiccari, A. et al., "Additive Manufacturing for Superalloys—Producibility and Cost Validation (Preprint)" pp. 1-27, Mar. 2011, Air Force Research Laboratory Materials and Manufacturing Directorate Wright-Patterson Air Force Base, OH 45433-7750.

(56) References Cited

OTHER PUBLICATIONS

Gaspar, B., "Microstructural Characterization of Ti—6A1—4V and its Relationship to Sample Geometry", Materials Engineering Dept., Cal Poly State University—San Luis Obispo, California, Jun. 2012.
Huang, Weidong, et al. "Laser solid forming of metal powder materials", *Cailiao Gongcheng (Journal of Materials Engineering) (China)* 40-43, appears to have been published in 2002. (abstract only in English).
Huang, et al., "An overview of development in additive manufacturing technology for metal parts in foreign countries", *Defense Manufacturing Technology*, Issue 5, Oct. 2012, pp. 26-30.
Jayakumar, A., "Why the aerospace industry is investing in 3-D printing", The Washington Post, Jun. 2014, downloaded from the Internet on Jun. 19, 2014 at http://www.washingtonpost.com/business/capitalbusiness/why-the-aerospace-industry-is-investing-in- . . . .
Kobryn, P. A., et al., "The Laser Additive Manufacture of Ti—6Al—4V", *JOM*, pp. 40-42, Sep. 2001.
Martina, F. et al., "Improved Microstructure and Increased Mechanical Properties of Additive Manufacture Produced Ti—6Al—4V by Interpass Cold Rolling", pp. 490-496, In 24$^{th}$ International Freeform Fabrication Symposium, Austin, Texas, 2013.
Martina, F., et al., "Investigation of the Benefits of Plasma Deposition for the Additive Layer Manufacture of Ti—6Al—4V", *Journal of Materials Processing Technology*, vol. 212:6, pp. 1377-1386, Jun. 2012.
Nannan, G. et al., "Additive manufacturing: technology, applications and research needs", abstract only, Frontiers of Mechanical Engineering, publisher SP Higher Education Press, May 2013.
Pedersen, R. "Microstructure and phase transformation of Ti—6Al—4V", Licentiate Thesis, Lulea University of Technology, Dept. of Applied Physics and Mechanical Engineering Materials, pp. 1-31 and appended papers I-II, May 2002.
Schulte, R., "Titanium Europe 2013: Forty Industry Leaders Review the State of the Metal and its Applications", International Titanium Association, Mar. 5 -7, 2013, Hamburg, Germany, 9 pages.
Sears, J. W., et al., "Applications in Direct Metal Laser Manufacturing", LAM Laser Additive Manufacturing Workshop, Western Illinois University, Quad City Manufacturing Laboratory, Feb. 29-Mar. 1, 2012.
Semiatin. S.L., et al. "Plastic Flow and Microstructure Evolution during Thermomechanical Processing of Laser-Deposited Ti—6Al—4V Preforms" Metallurgical and Materials Transactions A, vol. 32A, Jul. 2001, pp. 1801-1811.
Slattery et al., "Evaluation of Arcam Deposited Ti—6A—4V", 2$^{nd}$ SAIAS Symposium, Stellenbosch, South Africa, Sep. 2008.
Taminger, K. M., et al., "Electron Beam Freeform Fabrication for Cost Effective Near-Net Shape Manufacturing", pp. 16-1-16-10, Metals & Thermal Structures Branch, NASA Langley Research Center, Hampton, VA, NASA Technical Reports Server, May 2006.

Ti6Al4V Titanium Alloy—Arcam EBM System, marketing brochure, 2008, 3 pages, Arcam AB, Krokslätts, Fabriker 27A, SE 431 37 Mölndal, Sweden.
"Titanium Alloy Ti 6Al—4V", Alloy Data Sheet, pp. 1-10, CRS Holdings Inc., a subsidiary of Carpenter Technology Corporation, Jul. 2000.
Warwick, G., "Just getting started: Additive manufacturing drive new revolution", Aviation Week & Space Technology, p. 22, Nov. 2013.
Welsch, G., et al., "Deformation Characteristics of Age Hardened Ti—6Al—4V", *Metallurgical Transactions A*, vol. 8A, pp. 169-177, Jan. 1977.
Wooten, J., et al., "Electron Beam Melting Manufacturing for Production Hardware", publisher SAE International, 2008.
Zhanglong, Zhao, et al. "Microstructures and Properties of TC17 Powder Metallurgy Titanium Alloy Prepared by Laser Sintering/Isothermal Forging." *Rare Metal Materials and Engineering* 38(6) (2009): 1104-1107. (abstract only in English).
Zhang, Shuzhi, "Study on Hot Deformation Behavior and Processing Map of Ti—46Al—2Cr—4Nb—0.3Y Alloy", Dissertation for the Master's Degree in Engineering, B022-133, Chinese Master's Theses Full Text Database, Engineering Science and Technology I, pp. 1-5, appears to have been published in 2009 or 2010. (abstract only in English).
AMS 4999A, "Titanium Alloy Direct Deposited Products—6Al—4V Annealed", SAE Aerospace, pp. 1-12, Issued Feb. 2002, Revised Sep. 2011.
ASM Handbook, vol. 14—Forming and Forging, pp. 1-9, ASM International, 1998.
EOS Material Data Sheet: EOS Aluminum AlSi10Mg, 5 pages, May 2014, © 2014—EOS GmbH—Electro Optical Systems, Munich, Germany.
"Laser sintering system EOSINT M 280 for the production of tooling inserts, prototype parts and end products directly in metal", Sep. 2017, EOS GmbH, Munich, Germany, 4 pages.
Registration Record Series Pink Sheets, Designations and Chemical Composition Limits for Aluminum Alloys in the Form of Castings and Ingot, The Aluminum Association, Revised Nov. 2009, supersedes Feb. 2008, pp. 1-12.
Registration Record Series Teal Sheets, International Alloy Designations and Chemical Composition Limits for Wrought Aluminum and Wrought Aluminum Alloys, The Aluminum Association, Revised Nov. 2006, supersedes Apr. 2004, pp. 1-26.
International Search Report and Written Opinion dated Apr. 28, 2017, from corresponding International Application No. PCT/US2017/013504.
Standard, ASTM "F2792-12a (2012) Standard terminology for additive manufacturing technologies, ASTM International, West Conshohocken, PA, doi: 10.1520/F2792-12A."
International Search Report and Written Opinion issued by the European Patent Office in International Application No. PCT/US2017/013504.

\* cited by examiner

Smoothing of beads with a rastered beam that is roughly the same size as that used for building Smoothing of beads with a rastered beam that is larger in size than that used for building

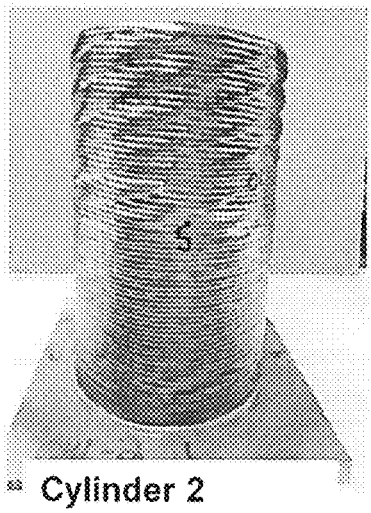
Cylinder 1
(0.125" wire)
Cylinder 2
(0.125" wire)
Cylinder 3
(0.045" wire)
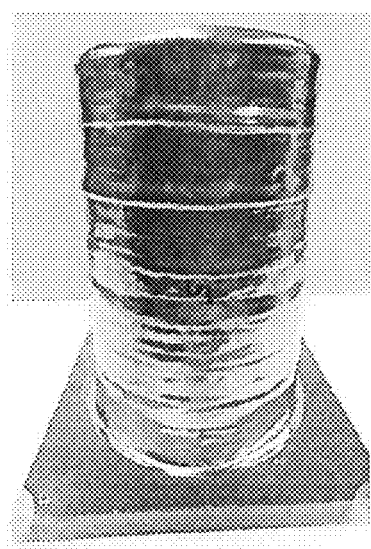
Cylinder 4
(0.125" wire)
Cylinder 5
(0.045" wire)
Figure 17

Cut away perspective side views contrasting the different surfaces visually observable in two cylinders with the same build parameters, wherein cylinder 2 (as made) vs. cylinder 4 (smoothed via ebeam)

METHODS FOR PRODUCING FORGED PRODUCTS AND OTHER WORKED PRODUCTS

CROSS-REFERENCE TO RELATED APPLICATIONS

This patent application is a non-provisional of and claims priority to U.S. Provisional Patent Application No. 62/278,753 filed Jan. 14, 2016, which is incorporated herein by reference in its entirety.

FIELD OF THE INVENTION

Generally, the present disclosure is directed towards methods of additively manufacturing metal components. More specifically, the present disclosure is directed towards different embodiments of additively manufacturing and smoothing an AM preform to configure an AM preform for downstream processing (working, forging, and the like).

BACKGROUND

Metal products may be formed into shapes via forging operations. To forge metal products, several successive dies (flat dies and/or differently shaped dies) may be used for each part, with the flat die or the die cavity in a first of the dies being designed to deform the forging stock to a first shape defined by the configuration of that particular die, and with the next die being shaped to perform a next successive step in the forging deformation of the stock, and so on, until the final die ultimately gives the forged part a fully deformed shape. See, U.S. Pat. No. 4,055,975.

SUMMARY

Broadly, the present patent application relates to improved methods for producing worked metal products (e.g., forged metal products; other types of hot worked and/or cold worked metal products).

In one embodiment, a method includes using additive manufacturing to produce a metal shaped-preform. After the using step (e.g. producing a metal shaped-preform using/via additive manufacturing), the metal shaped-preform may be forged into a final forged product. In one embodiment, the forging step comprises a single die forging step. In some embodiments, a single forging step is represented by a single heat and forge cycle. In some embodiments, the forge cycle includes multiple deformations without a heating cycle between the deformations. In some embodiments, a heat cycle represents heating the material to the specified temperature prior to the forging deformation step. (As a non-limiting example, a hammer press many times has multiple deformations within a single heat cycle). In one embodiment, the metal preform comprises at least one of titanium, aluminum, nickel, steel, stainless steel, and titanium aluminide. In one embodiment, the metal shaped-preform may be a titanium alloy. For example, the metal shaped-preform may comprise a Ti-6Al-4V alloy. In another embodiment, the metal shaped-preform may be an aluminum alloy. In yet another embodiment, the metal shaped-preform may be a nickel alloy. In yet another embodiment, the metal shaped-preform may be one of a steel and a stainless steel. In another embodiment, the metal shaped-preform may be a metal matrix composite. In yet another embodiment, the metal shaped-preform may comprise titanium aluminide. For example, in one embodiment, the titanium alloy may include at least 48 wt. % Ti and at least one titanium aluminide phase, wherein the at least one titanium aluminide phase is selected from the group consisting of $Ti_3Al$, TiAl and combinations thereof. In another embodiment, the titanium alloy includes at least 49 wt. % Ti. In yet another embodiment, the titanium alloy includes at least 50 wt. % Ti. In another embodiment, the titanium alloy includes 5-49 wt. % aluminum. In yet another embodiment, the titanium alloy includes 30-49 wt. % aluminum, and the titanium alloy comprises at least some TiAl. In yet another embodiment, the titanium alloy includes 5-30 wt. % aluminum, and the titanium alloy comprises at least some $Ti_3Al$.

The forging step may comprise heating the metal shaped-preform to a stock temperature, and bringing the metal shaped-preform to the forging die which has been heated separately to the desired temperature, and contacting the metal shaped-preform with a forging die. In one embodiment, the die may be at a temperature that is nominally equal to the metal shaped-preform temperature (e.g. isothermal forging). In another embodiment, when the contacting step is initiated, the forging die may be a temperature that is at least 10° F. lower than the stock temperature. In another embodiment, when the contacting step is initiated, the forging die is a temperature that is at least 25° F. lower than the stock temperature. In yet another embodiment, when the contacting step is initiated, the forging die is a temperature that is at least 50° F. lower than the stock temperature. In another embodiment, when the contacting step is initiated, the forging die is a temperature that is at least 100° F. lower than the stock temperature. In yet another embodiment, when the contacting step is initiated, the forging die is a temperature that is at least 200° F. lower than the stock temperature.

In one aspect, the final forged product is a component for an engine. In one embodiment, the final forged product is a blade for a jet engine. In one embodiment, the final forged product is a component for a vehicle (e.g. land, water, air, and combinations thereof). In one embodiment, the final forged product is a structural component of a vehicle. In another embodiment, the final forged product is a structural aerospace component (e.g. spar, rib, attachment fitting, window frame, landing gear, etc.). In another embodiment, the final forged product is a structural component for a land-based turbine application. In another embodiment, the final forged product is a component for a land-based and/or water-based vehicle. In another embodiment, as described below, the final forged product is an engine containment ring.

In another aspect, a method comprises using additive manufacturing to produce a metal shaped-preform, and concomitant to, or after the using step, working the metal shaped-preform into a final worked product via at least one of: (i) rolling, (ii) ring rolling, (iii) ring forging, (iv) shape rolling, (v) extruding, and (vi) combinations thereof. In one embodiment, the working is rolling. In another embodiment, the working is ring rolling. In yet another embodiment, the working is ring forging. In another embodiment, the working is shaped rolling. In yet another embodiment, the working is extruding. Without being bound by a particular mechanism or theory, it is believed that one such reason for producing an additively manufactured billet for these processes is to enable (e.g. configure) bi-alloy or multi-alloy starting stock for rolling, forging, or extrusion operations. In some embodiments, the bi-alloy or multi-alloy starting stock is unachievable using conventional billet and starting stock methods.

In some embodiments, when the metal shaped-preform comprises a Ti-6Al-4V alloy, the forging step comprises heating the metal shaped-preform to a stock temperature, and contacting the metal shaped-preform with a forging die. In this regard, the contacting step comprises deforming the metal shaped-preform via the forging die. In one embodiment, the contacting step comprises deforming the metal shaped-preform via the forging die to realize a true strain of from 0.05 to 1.10 in the metal shaped-preform. In another embodiment, the contacting step comprises deforming the metal shaped-preform via the forging die to realize a true strain of at least 0.10 in the metal shaped-preform. In yet another embodiment, the contacting step comprises deforming the metal shaped-preform via the forging die to realize a true strain of at least 0.20 in the metal shaped-preform. In another embodiment, the contacting step comprises deforming the metal shaped-preform via the forging die to realize a true strain of at least 0.25 in the metal shaped-preform. In yet another embodiment, the contacting step comprises deforming the metal shaped-preform via the forging die to realize a true strain of at least 0.30 in the metal shaped-preform. In another embodiment, the contacting step comprises deforming the metal shaped-preform via the forging die to realize a true strain of at least 0.35 in the metal shaped-preform. In another embodiment, the contacting step comprises deforming the metal shaped-preform via the forging die to realize a true strain of not greater than 1.00 in the metal shaped-preform. In yet another embodiment, the contacting step comprises deforming the metal shaped-preform via the forging die to realize a true strain of not greater than 0.90 in the metal shaped-preform. In another embodiment, the contacting step comprises deforming the metal shaped-preform via the forging die to realize a true strain of not greater than 0.80 in the metal shaped-preform. In yet another embodiment, the contacting step comprises deforming the metal shaped-preform via the forging die to realize a true strain of not greater than 0.70 in the metal shaped-preform. In another embodiment, the contacting step comprises deforming the metal shaped-preform via the forging die to realize a true strain of not greater than 0.60 in the metal shaped-preform. In yet another embodiment, the contacting step comprises deforming the metal shaped-preform via the forging die to realize a true strain of not greater than 0.50 in the metal shaped-preform. In another embodiment, the contacting step comprises deforming the metal shaped-preform via the forging die to realize a true strain of not greater than 0.45 in the metal shaped-preform. As mentioned above, the forging step may comprise heating the metal shaped-preform to a stock temperature.

In one aspect, the forging step comprises heating the metal-shaped preform to a stock temperature. In one approach, the metal shaped preform is heated to a stock temperature of from 850° C. to 978° C. In one embodiment, the metal shaped preform is heated to a stock temperature of at least 900° C. In another embodiment, the metal shaped preform is heated to a stock temperature of at least 950° C. In yet another embodiment, the metal shaped preform is heated to a stock temperature of at least 960° C. In another embodiment, the metal shaped preform is heated to a stock temperature of not greater than 975° C. In yet another embodiment, the metal shaped preform is heated to a stock temperature of not greater than 973° C.

In one aspect, the step of using additive manufacturing to produce a metal shaped-preform comprises adding material, via additive manufacturing, to a building substrate thereby producing the metal shaped-preform. In some embodiments, a substrate is utilized in additive manufacturing onto which layers are built and/or deposited in order to produce the desired geometry of an additive manufacturing form/product. In one embodiment, the additively manufactured deposit or build is removed from the substrate and comprises the metal shaped-preform. In another embodiment, the substrate or portions of the substrate remains a part of the metal-shaped preform. In one embodiment, the material is a first material having a first strength and wherein the building substrate is comprised of a second material having a second strength. In some embodiments, the first material has a first fatigue property and the second material has a second fatigue property. As a non-limiting example, a layer of a first material having low strength and high toughness could be added, via additive manufacturing, to a building substrate comprised of a second material having high strength and low toughness, thereby producing a metal-shaped preform useful, for example, in ballistic applications. In some embodiments, substrates are selected/tailored/chosen for reasons including (but not limited to): geometry, microstructure, material properties and characteristics, chemistry, cost, amongst others based on (e.g. in order to promote) the design specifications of the finished product. For example, the use of a rolled plate or other wrought substrate allows for reduced and/or minimal work to be utilized in those areas of the metal shaped-preform where the substrate resides due to the substrate already exhibiting forged or wrought properties. In some embodiments, the material and substrate are chosen to be the same.

In one embodiment, the building substrate comprises a first ring of a first material, and the using step comprises adding a second material, via additive manufacturing, to the first ring thereby forming a second ring, wherein the second ring is integral with the first ring. In this regard, rings consisting of multi-materials are produced.

In another aspect, the method includes, after the forging step, annealing the final forged product. In one embodiment, when the metal shaped-preform comprises a Ti-6Al-4V alloy, the annealing step comprises heating the final forged product to a temperature of from about 640° C. to about 816° C. In another embodiment, when the metal shaped-preform comprises a Ti-6Al-4V alloy, the annealing step comprises heating the final forged product to a temperature of from about 670° C. to about 750° C. In yet another embodiment, when the metal shaped-preform comprises a Ti-6Al-4V alloy, the annealing step comprises heating the final forged product to a temperature of from about 700° C. to about 740° C. In another embodiment, when the metal shaped-preform comprises a Ti-6Al-4V alloy, the annealing step comprises heating the final forged product to a temperature of about 732° C.

BRIEF DESCRIPTION OF THE DRAWINGS

FIG. 17-19 depict photographs and a graph depicting surface roughness for a corresponding Example in the Examples section, in accordance with one or more embodiments of the instant disclosure.

DETAILED DESCRIPTION

Reference will now be made in detail to the accompanying drawings, which at least assist in illustrating various pertinent embodiments of the new technology provided for by the present disclosure.

Figure 1:
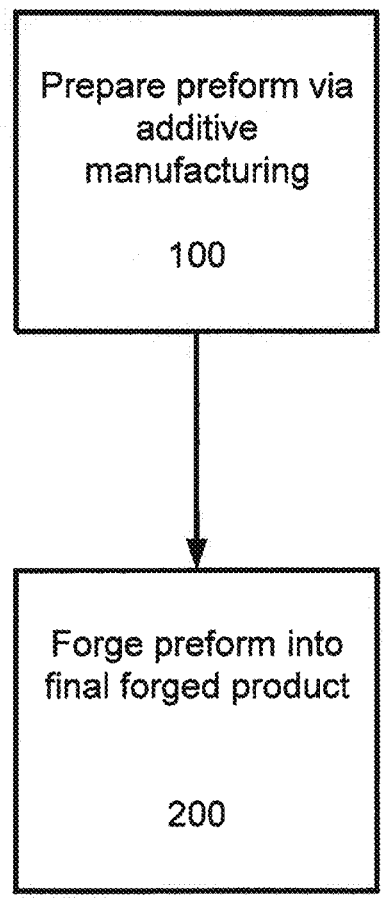
FIG. 1 is a schematic illustration of one embodiment of a method of producing a final forged product, in accordance with the instant disclosure.

One embodiment of the new method for producing forged metal products is illustrated in FIG. 1. In the illustrated embodiment, the method includes a step of preparing (100) a metal shaped-preform via additive manufacturing, followed by forging (200) the metal shaped-preform into a final forged product (e.g., a net-shape product or near net-shape product). After the forging step (200), the final forged product may require no additional machining or other processing steps, thus facilitating a lower total cost of manufacturing. Furthermore, the final forged product may realize improved properties (e.g., relative to a pure additively manufactured component). Some non-limiting examples of some properties that may be improved in the final forged product (as compared to an AM component with no forging) include: fatigue performance, ability to perform non-destructive evaluation including ultrasonic and radiographic inspection, static strength, ductility, and combinations thereof.

In some embodiments, the additive manufacturing step (100) prepares the metal shaped-preform. As used herein, "additive manufacturing" means a process of joining materials to make objects from 3D model data, usually layer upon layer, as opposed to subtractive manufacturing methodologies, as defined in ASTM F2792-12a for Standard Terminology for Additively Manufacturing Technologies. The metal shaped preform may be manufactured via any appropriate additive manufacturing technique described in this ASTM standard, such as binder jetting, directed energy deposition, material extrusion, material jetting, powder bed fusion, digital printing techniques, or sheet lamination, among others. In some embodiments, precisely designed and/or tailored products can be produced.

In some embodiments, the metal shaped-preform produced by the additive manufacturing step (100) is made from any metal suited for both additive manufacturing and forging, including, for example metals or alloys of titanium, aluminum, nickel (e.g., INCONEL), steel, and stainless steel, among others. An alloy of titanium is an alloy having titanium as the predominant alloying element. An alloy of aluminum is an alloy having aluminum as the predominant alloying element. An alloy of nickel is an alloy having nickel as the predominant alloying element. An alloy of steel is an alloy having iron as the predominant alloying element, and at least some carbon. An alloy of stainless steel is an alloy having iron as the predominant alloying element, at least some carbon, and at least some chromium. In one embodiment, the metal shaped-preform is an intermediate product in the form of a precursor to a blade for a jet engine.

Still referring to FIG. 1, once the metal shaped-preform is formed, the metal shaped-preform is forged (200). In one embodiment, the forging step (200) uses a single forging step to die forge the metal shaped-preform into the final forged product. In one embodiment, the forging step (200) uses a single blocker (or metal shaped-preform) to die forge the metal shaped-preform into the final forged product. In some embodiments, forging (200) the metal shaped-preform, configures the final forged product into realizing improved properties, such as improved porosity (e.g., less porosity), improved surface roughness (e.g., less surface roughness, i.e., a smoother surface), and/or better mechanical properties (e.g., improved surface hardness), among others.

Figure 2:
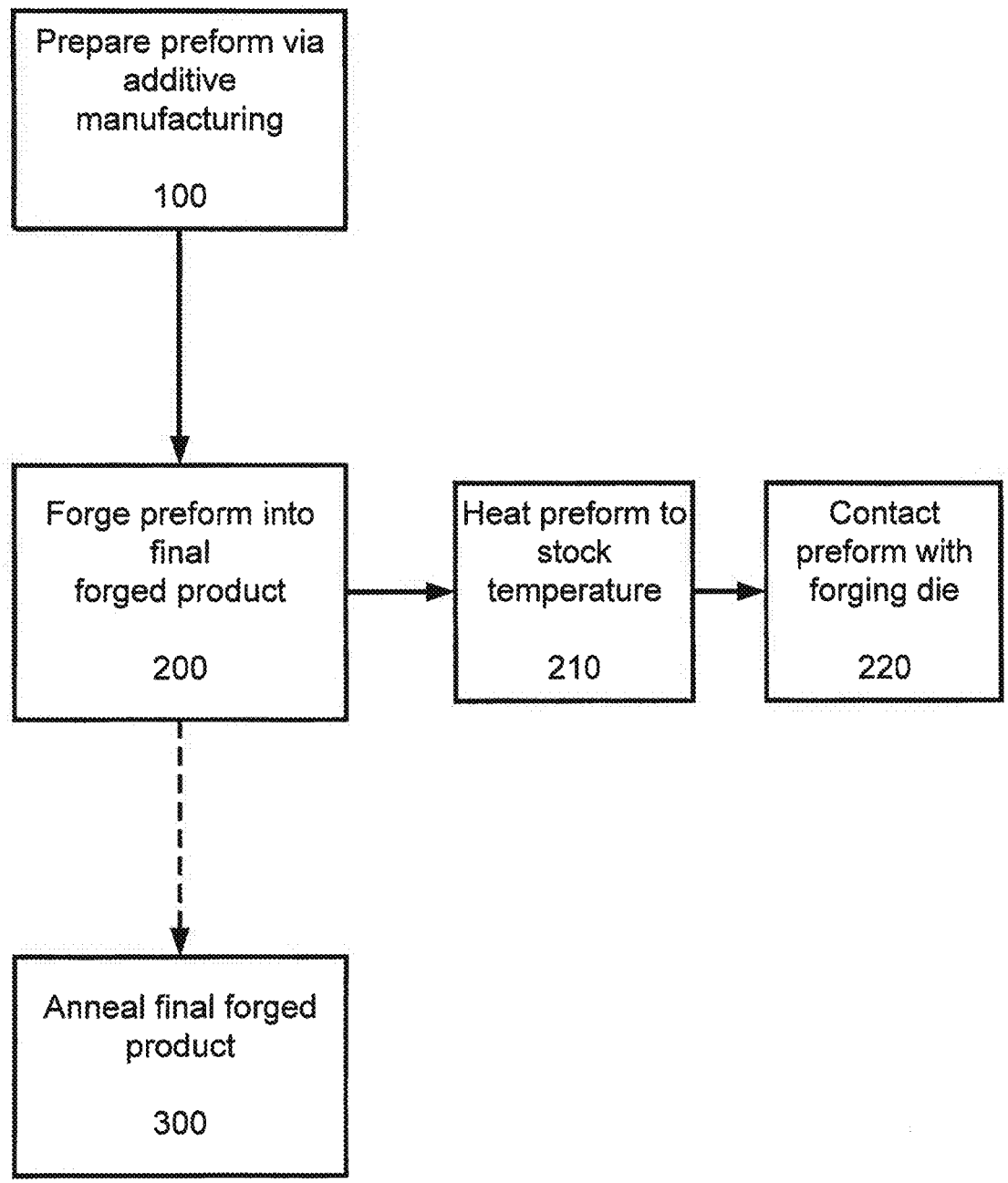
FIG. 2 is a schematic illustration of one embodiment of a method of producing a final forged product, wherein the method includes an optional annealing step, in accordance with the instant disclosure.

Referring now to FIG. 2, in one embodiment, during the forging step (200), the dies and/or tooling of the forging process is at a lower temperature than the metal-shaped preform. In this regard, the forging step includes heating the metal shaped-preform to a stock temperature (the target temperature of the preform prior to the forging) (210), and contacting the metal shaped-preform with a forging die (220). In one embodiment, when the contacting step (220) is initiated, the forging die is a temperature that is at least 10° F. lower than the stock temperature. In another embodiment, when the contacting step (220) is initiated, the forging die is a temperature that is at least 25° F. lower than the stock temperature. In yet another embodiment, when the contacting step (220) is initiated, the forging die is a temperature that is at least 50° F. lower than the stock temperature. In another embodiment, when the contacting step (220) is initiated, the forging die is a temperature that is at least 100° F. lower than the stock temperature. In yet another embodiment, when the contacting step (220) is initiated, the forging die is a temperature that is at least 200° F. lower than the stock temperature. In another embodiment, when the contacting step (220) is initiated, the forging die is a temperature that is at least 300° F. lower than the stock temperature. In yet another embodiment, when the contacting step (220) is initiated, the forging die is a temperature that is at least 400° F. lower than the stock temperature. In another embodiment, when the contacting step (220) is initiated, the forging die is a temperature that is at least 500° F. lower than the stock temperature. In some embodiments, when the contacting step is initiated, the forging die completes an isothermal forging. In one aspect, after the forging step (200) the final forged product is annealed (300). In some embodiments, the annealing step is configured to achieve desired properties in the final forged product. In some embodiments, the annealing step (300) facilitates the relieving of residual stress in the metal-shaped preform due to the forging step (200). In one approach, the metal-shaped preform comprises a Ti-6Al-4V alloy and the annealing step (300) comprises heating the final forged product to a temperature of from about 640° C. (1184° F.) to about 816° C. (1500° F.) and for a time of from about 0.5 hour to about 5 hours. In one embodiment, the annealing step (300) comprises heating the final forged product to a temperature of at least about 640° C. (1184° F.). In another embodiment, the annealing step (300) comprises heating the final forged product to a temperature of at least about 670° C. (1238° F.). In yet another embodiment, the annealing step (300) comprises heating the final forged product to a temperature of at least about 700° C. (1292° F.). In another embodiment, the annealing step (300) comprises heating the final forged product to a temperature of not greater than about 760° C. (1400° F.). In yet another embodiment, the annealing step (300) comprises heating the final forged product to a temperature of not greater than about 750° C. (1382° F.). In another embodiment, the annealing step (300) comprises heating the final forged product to a temperature of not greater than about 740° C. (1364° F.). In yet another embodiment, the time is at least about 1 hour. In another embodiment, the time is at least about 2 hours. In yet another embodiment, the time is not greater than about 4 hours. In another embodiment, the time is not greater than about 3 hours. In yet another embodiment, the annealing step (300) comprises heating the final forged product to a temperature of about 732° C. (1350° F.) and for a time of about 2 hours.

In some embodiments, the contacting step (220) comprises applying a sufficient force to the metal shaped-preform via the forging die to realize a pre-selected amount of true strain in the metal shaped-preform. In some embodiments, the pre-selected amount of strain is varied throughout the finished forging to accommodate, for example, the use of a wrought substrate plate, etc. In one embodiment, the applying a sufficient force step comprises deforming the metal shaped-preform via the forging die. As used herein "true strain" ($\varepsilon_{true}$) is given by the formula:

$$\varepsilon_{true} = \ln(L/L_0)$$

Where $L_0$ is initial length of the material and L is the final length of the material. In one embodiment, the contacting step (220) comprises applying sufficient force to the metal shaped-preform via the forging die to realize a true strain of from about 0.05 to about 1.10 in the metal shaped-preform. In another embodiment, the contacting step (220) comprises applying sufficient force to the metal shaped-preform via the forging die to realize a true strain of at least 0.10 in the metal shaped-preform. In another embodiment, the contacting step (220) comprises applying sufficient force to the metal shaped-preform via the forging die to realize a true strain of at least 0.20 in the metal shaped-preform. In yet another embodiment, the contacting step (220) comprises applying a sufficient force to the metal shaped-preform via the forging die to realize a true strain of at least 0.25 in the metal shaped-preform. In another embodiment, the contacting step (220) comprises applying sufficient force to the metal shaped-preform via the forging die to realize a true strain of at least 0.30 in the metal shaped-preform. In yet another embodiment, the contacting step (220) comprises applying sufficient force to the metal shaped-preform via the forging die to realize a true strain of at least 0.35 in the metal shaped-preform. In another embodiment, the contacting step (220) comprises applying sufficient force to the metal shaped-preform via the forging die to realize a true strain of not greater than 1.00 in the metal shaped-preform. In yet another embodiment, the contacting step (220) comprises applying sufficient force to the metal shaped-preform via the forging die to realize a true strain of not greater than 0.90 in the metal shaped-preform. In another embodiment, the contacting step (220) comprises applying sufficient force to the metal shaped-preform via the forging die to realize a true strain of not greater than 0.80 in the metal shaped-preform. In yet another embodiment, the contacting step (220) comprises applying sufficient force to the metal shaped-preform via the forging die to realize a true strain of not greater than 0.70 in the metal shaped-preform. In another embodiment, the contacting step (220) comprises applying sufficient force to the metal shaped-preform via the forging die to realize a true strain of not greater than 0.60 in the metal shaped-preform. In yet another embodiment, the contacting step (220) comprises applying sufficient force to the metal shaped-preform via the forging die to realize a true strain of not greater than 0.50 in the metal shaped-preform. In another embodiment, the contacting step (220) comprises applying sufficient force to the metal shaped-preform via the forging die to realize a true strain of not greater than 0.45 in the metal shaped-preform. In yet another embodiment, the contacting step (220) comprises applying sufficient force to the metal shaped-preform via the forging die to realize a true strain of about 0.40 in the metal shaped-preform.

In one embodiment, the metal shaped-preform is a low ductility material, such as a metal matrix composite or an intermetallic material. In one embodiment, the metal shaped-preform is titanium aluminide.

Without being bound by a particular mechanism or theory, it is believed that using the new processes disclosed herein facilitates more economical production of final forged products from such low ductility materials. As a non-limiting example, with the various embodiments of the foregoing methods, low ductility material(s) are forged using dies and/or tooling that are at a lower temperature than the low ductility material. Thus, in one embodiment, the forging is absent of isothermal forging (i.e., the forging process does not include isothermal forging), and thus can include any of the stock temperature versus die temperature differentials noted previously.

In one aspect, the metal shaped preform is a titanium (Ti) alloy, and thus includes titanium as the predominant alloying element. In one embodiment, a titanium alloy includes at least 48 wt. % Ti. In another embodiment, a titanium alloy includes at least 49 wt. % Ti. In yet another embodiment, a titanium alloy includes at least 50 wt. % Ti. In one embodiment, the titanium alloy comprises one or more titanium aluminide phases. In one embodiment, the titanium aluminide phase(s) is/are one or more of $Ti_3Al$ and $TiAl$. In some embodiments, when titanium aluminides are present, the titanium alloy may include 5-49 wt. % aluminum. In one embodiment, the titanium aluminide phase(s) comprise $TiAl$. In one embodiment, the titanium alloy includes 30-49 wt. % aluminum, and the titanium alloy comprises at least some $TiAl$. In one embodiment, the titanium aluminide phase(s) comprises $Ti_3Al$. In one embodiment, the titanium alloy includes 5-30 wt. % aluminum, and the titanium alloy comprises at least some $Ti_3Al$. In one embodiment, the titanium alloy comprises aluminum and vanadium.

In one embodiment, the metal shaped preform comprises a Ti-6Al-4V alloy (a titanium alloy having about 6 wt. % aluminum and about 4 wt. % vanadium). In this regard, the Ti-6Al-4V preforms are heated to a stock temperature of from about 850° C. (1562° F.) to about 978° C. (1792° F.). In one embodiment, the Ti-6Al-4V preforms are heated to a stock temperature of at least 900° C. (1652° F.). In another embodiment, the Ti-6Al-4V preforms are heated to a stock temperature of at least 925° C. (1697° F.). In another embodiment, the Ti-6Al-4V preforms are heated to a stock temperature of at least 950° C. (1742° F.). In yet another embodiment, the Ti-6Al-4V preforms are heated to a stock temperature of at least 960° C. (1760° F.). In another embodiment, the Ti-6Al-4V preforms are heated to a stock temperature of not greater than 975° C. (1787° F.). In yet another embodiment, the Ti-6Al-4V preforms are heated to a stock temperature of not greater than 973° C. (1783° F.).

In some embodiments, the final forged product is used in the aerospace, aviation, and/or medical industries. In some embodiments, the final forged product is, for example, a turbine or blade. In one embodiment, the final forged product is a blade for a jet engine.

In some embodiments, after the additive manufacturing step (100), the metal shaped-preform is forged (200) to create a final forged product. In other embodiments, after the additive manufacturing step (100), the metal shaped-preform is processed via other forms of working (e.g., hot working) to create a final worked product 710.

In some embodiments, the working of the metal shaped-preform includes at least one of: rolling 710, ring rolling 720, ring forging 730, shaped rolling 740, and/or extruding 750 to create the final worked product. In some embodiments, the final worked product realizes improved properties, such as improved porosity (e.g., less porosity), improved surface roughness (e.g., less surface roughness, i.e., a smoother surface), and/or better mechanical properties (e.g., improved surface hardness), among others. In some embodiments, the final worked product realizes a predetermined shape. In some embodiments, the metal shaped-preform is ring rolled, ring forged and/or extruded (e.g., forced through a die) to create a hollow final worked product. In some embodiments, the metal shaped-preform is rolled to produce a final worked product that realizes improved porosity. In some embodiments, the metal shaped-preform is shape rolled to produce a final worked product that realizes a predetermined shape (e.g., a curve having a specified radius).

As used herein, "ring rolling" means the process of rolling a ring of smaller diameter (e.g., a first ring having a first diameter) into a ring of larger diameter (e.g., a second ring having a second diameter, wherein the second diameter is larger than the first diameter), optionally with a modified cross section (e.g., a cross sectional area of the second ring is different than a cross sectional area of the first ring) by the use of two rotating rollers, one placed in the inside diameter of the ring and the second directly opposite the first on the outside diameter of the ring.

As used herein, "ring forging" means the process of forging a ring of smaller diameter (e.g., a first ring having a first diameter) into a ring of larger diameter (e.g., a second ring having a second diameter, wherein the second diameter is larger than the first diameter), optionally with a modified cross section (e.g., a cross sectional area of the second ring is different than a cross sectional area of the first ring) by squeezing the ring between two tools or dies, one on the inside diameter and one directly opposite on the outside diameter of the ring.

As used herein, "shaped rolling" means the process of shaping or forming by working the piece (i.e., the metal shaped-preform) between two or more rollers, which may or may not be profiled, to impart a curvature or shape to the work piece (i.e., the metal shaped-preform).

Figure 5:
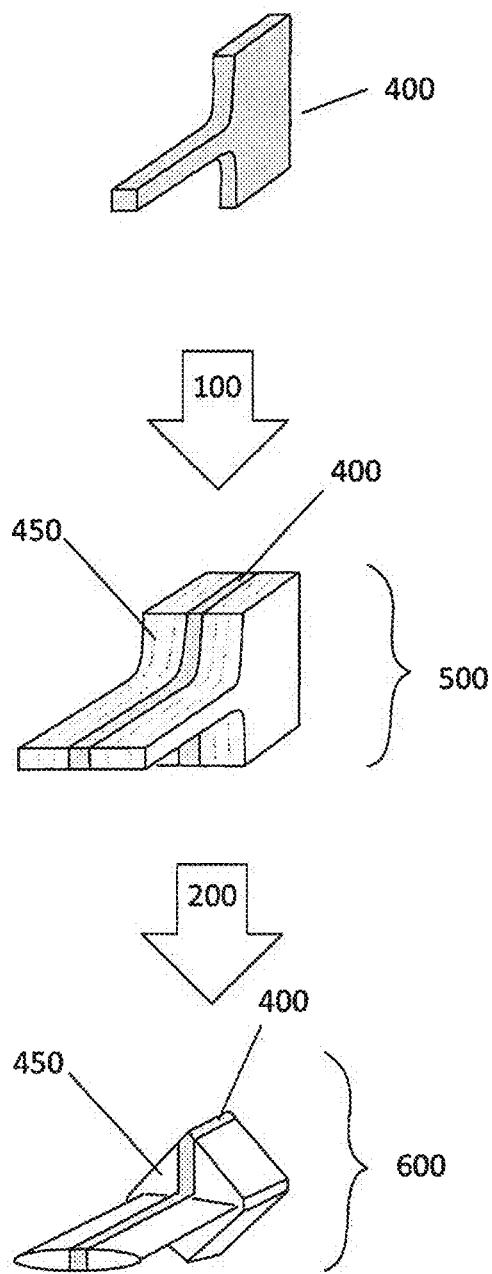
FIG. 5 is a schematic illustration of one embodiment of a method of producing a final forged product, wherein the final forged product includes an integral building substrate, in accordance with the instant disclosure.

In some embodiments, the step of preparing the metal shaped-preform via additive manufacturing (100) includes incorporating a building substrate into the metal shaped-preform. Referring now to FIG. 5, one embodiment of incorporating a building substrate (400) into the metal shaped-preform (500) is shown. In the illustrated embodiment, material (450) is added to a building substrate (400) via additive manufacturing (100) to produce the metal shaped-preform (500).

As used herein, "building substrate" and the like means a solid material (substrate) that is incorporated into a metal shaped-preform. In some embodiments, the metal shaped-preform (500), which includes the building substrate (400), is forged (200) into a final forged product (600). Thus, in some embodiments, the final forged product (600) includes the building substrate (400) as an integral piece. In some embodiments, the substrate does not need to be shaped such that it resembles and/or mimics the geometry of the desired deposit or metal shaped-preform. In some embodiments, the substrate is a rectangular plate on which the additive manufacturing is performed and is machined or otherwise shaped to the desired geometry after additive manufacturing has been performed. In some embodiments, the substrate is a forging, extrusion, and/or any other material upon which additive manufacturing can be performed. In some embodiments, additional processing of the metal shaped-preform is performed.

In some embodiments, additional processing includes machining prior to or subsequent to the forging step.

In some embodiments, additional processing includes wire electrical discharge machining (wire EDM) prior to or subsequent to the forging step.

In some embodiments, additional processing includes surface finishing prior to or subsequent to the forging step.

In some embodiments, additional processing includes water jet cutting prior to or subsequent to the forging step.

Without being bound by a particular mechanism or theory, it is believed that certain methods of additive manufacturing result in a characteristic topography in the metal shaped-preform (e.g. surface undulations and/or ridges).

As non-limiting examples, material extrusion and directed energy deposition are two such classes of additive manufacturing that include start, stop, and bead topography characteristics in the final formed additive part. As used herein, "bead" means a continuous deposit of fused metal (e.g. in an additive manufacturing process).

As used herein, "directed energy deposition" refers to an additive manufacturing process in which a focused thermal energy is used to fuse materials by melting as they are being deposited. Non-limiting examples of directed energy deposition include Sciaky, plasma arc, and other wire feed methods.

As used herein, "material extrusion" refers to an additive manufacturing process in which material is selectively dispensed through a nozzle or orifice.

As used herein, a "workable preform" means a preform made via additive manufacturing that has suitable characteristics (e.g. acceptable surface finish and/or geometric features) sufficient to undergo working (e.g. hot working).

As used herein, a "forgeable preform" means a preform made via additive manufacturing that has suitable characteristics (e.g. acceptable surface finish and/or geometric features) sufficient to undergo forging.

In some embodiments, the specifications for a workable preform and/or forgeable preform with an acceptable surface finish and/or geometric features are dependent on the final part geometry (among other variables). In some embodiments, the preform is configured to be free of features that would restrict the flow of metal. In some embodiments, corners on the preforms are configured with appropriate radii (e.g. rounded corners) sufficient for subsequent working to form a worked product (e.g. final forged product).

In some embodiments, the workable preform is configured via one or more embodiments of the instant disclosure, to be substantially free from defects and/or other features (e.g. cracks, gaps, nicks, gouges, sawing serrations, rough portions, ridges, and/or uneven surfaces and other features along at least a portion of the surface) that interrupt a smooth working and/or forging surface. In some embodiments, the workable preform is configured via one or more embodiments of the instant disclosure, to be substantially free from defects and/or other features such that, when worked (or forged) the resulting final worked product (or final forged product) is substantially free from defects (e.g. folds, laps, cavities, non-fill, underfill, and/or other defects).

Some non-limiting examples of defects in the worked final product and/or forged final product include: folds, laps, and/or shuts (e.g. cold shuts). As used herein, "fold" means a forging defect caused by folding the metal back on its own surface during its flow in the die cavity. As used herein, "lap" means a surface irregularity appearing as a fissure or opening, caused by the folding over of hot metal, fins or sharp corners and by subsequent rolling or forging (but not welding) of these into the surface. As used herein, "shuts" are faults produced in a forging by incorrect tool design or incorrect flow of metal that results in the formation of a crack in the forging surface. As used herein, "cold lap" means a flaw that results when a workpiece fails to fill the die cavity during the first forging. As used herein, "seam" means a formation caused as subsequent dies force metal over a gap to leave a seam on the workpiece surface. As used herein, a "cold shut" is a defect (such as lap) that forms whenever metal folds over itself during forging. As a non-limiting example, cold shuts can occur where vertical and horizontal surfaces intersect.

Without being bound by a particular mechanism or theory, these defects can be attributed to surface discontinuities, sharp corners and/or internal features restricting metal flow or otherwise result in improper distribution of the metal during a working operation (e.g. forging). Thus, in accordance with one or more of the embodiments of the instant disclosure, prior to forging, if defects are observed in the metal-shaped preform they are addressed to provide a suitable workable preform configured for further working (e.g. forging). This can be done by mechanically smoothing the surface or removing the defect. Mechanical grinding is a typical operation that is used to prepare preforms and blockers for the forging operation.

In one embodiment, the workable perform (e.g. forgeable perform) is quantified via profilometry techniques (e.g. including contact and/or non-contact analytical methods).

In one embodiment, the workable perform (e.g. forgeable perform) is quantified by measuring the depth to width ratio of the valleys along a portion of the surface of the metal shaped perform.

In one embodiment, the workable perform (e.g. forgeable perform) is quantified by measuring the surface roughness (RA) along at least a portion of the surface of the metal shaped perform.

In some embodiments, the surface roughness is measured via analytical techniques that are contact methods. In some embodiments, the surface roughness is measured via analytical techniques that are non-contact methods (e.g. blue light scans or white light scans, to name a few).

In some embodiments, via the additive manufacturing step, the surface of additively manufactured components can be rough (e.g. a plurality of raised ridges indicative of the bead deposition path), or have a periodic or random surface texture, roughness, or morphology, due to the layer-by-layer and bead-by-bead deposition technique used by many of the additive manufacturing technologies.

In one embodiment, a method is provided, comprising: (a) using additive manufacturing to produce a metal shaped-preform, the metal-shaped perform configured with a plurality of undulations in the surface indicative of an additive manufacturing build; (b) smoothing the plurality of undulations on the surface of the metal shaped-preform via an energy source sufficient to provide a workable preform (or forgeable preform) configured for a further working operation; and (c) working the metal shaped-preform into a final forged product.

In some embodiments, preparation of the metal shaped-preform includes smoothing operations to remove undulations in the surface of the part due to the layered structure of the deposit produced using additive manufacturing processes. In some additive manufacturing processes, each layer may consist of a pattern of individual deposits, which may introduce undulations in the surface of the part due to the geometry of the individual deposits.

In some embodiments, the method comprises a smoothing step sufficient to provide surfaces appropriate for working and/or forging (e.g. to avoid defects such as folds and voids).

Some non-limiting examples of surface smoothing techniques include: electron beam smoothing, flash lamp melting, laser melting, arc melting, sanding, blasting, machining, grinding, laser ablation, amongst others.

In some embodiments, the metal shaped-preforms include smooth edges (e.g. such that the metal-shaped perform is configured for forging). In some embodiments, the metal shaped-preforms are configured with little to no discontinuous features In some embodiments, with a smoothing step, sufficient smoothing to the AM preform results in smooth surfaces and appropriately filled corners and edges such that the mechanical grinding and chipping operations are avoided.

In some embodiments, with an additive path smoothing step, sufficient smoothing to the AM preform results in smooth surfaces and appropriately filled corners and edges such that the mechanical grinding and chipping operations are avoided.

In some embodiments, the using additive manufacturing to build a metal shaped perform includes using a non-powder based additive manufacturing process to build a metal shaped perform. In some embodiments, the smoothing step comprises using first set of beam parameters to additively manufacture a metal shaped preform (e.g. first beam size, first beam current, first travel speed, first wire feed rate, first beam pattern, and first scan path), followed by adjusting and/or changing to a second set of beam parameters configured for smoothing. In some embodiments, wire feed is left off for beam smoothing.

In some embodiments, the beam is utilized for removal (burn off) of undesirable material that has collected on the substrate. In some embodiments, the beam is utilized for preheating the substrate (prior to the using step).

In some embodiments, the using additive manufacturing step comprises additively manufacturing a metal shaped perform via a continuous exterior build plan sufficient to realize a metal shaped-preform capable of further working (e.g. forging) to yield a forged final product. In some embodiments, depositing the bead (deposited via a continuous exterior build plan) is configured to promote metal shaped-preform with smooth surface. In some embodiments, depositing the bead is configured to promote smooth edges in the metal shaped-preform.

In some embodiments, after the additive manufacturing step, some embodiments, the energy source is the same energy source as the additive manufacturing machine. In some embodiments, the energy source is an add-on component to the additive manufacturing machine (and not utilized to perform the additive manufacturing step). In some embodiments, the energy source is a separate piece of equipment from the energy source utilized with the additive manufacturing machine to create the build/deposit of additive feed material.

In some embodiments, the energy source comprises: a laser beam, an electron beam, an arc torch, a plasma torch, flash lamp, a torch, a burner, amongst others, which is used to smooth the surface of an additively manufactured deposit.

In some embodiments, the smoothing step comprises, reducing the surface roughness of a measured portion of the surface of the metal shaped perform.

In some embodiments, the smoothing step comprises reducing the depth to width ratio of the valleys along a measured portion of the surface of the metal shaped-preform.

In some embodiments, the smoothing step comprises reducing the roughness along a measured portion of the metal shaped-preform, as detected with a blue light scan.

In some embodiments, the smoothing step comprises: increasing the temperature of a surface portion of the part in order to promote melting of the uneven surface portion.

In some embodiments, smoothing includes melting, softening, and/or otherwise consolidating at least a portion of the deposited AM path geometry in order to smooth the surface of the metal shaped-preform.

In some embodiments, smoothing comprises heating at least a portion of an exterior surface of an AM deposit with an energy source (e.g. to melt, soften, and/or consolidate non-planar surfaces/raised ridges on the metal shaped-preform).

In some embodiments, smoothing comprises heating at least a portion of an exterior surface of an AM deposit with an energy source (e.g. to melt, soften, and/or consolidate non-planar surfaces/raised ridges on the metal shaped-preform).

In some embodiments, smoothing comprises heating (e.g. melting, softening, and/or consolidating) at least a portion (fraction) of a single bead depth.

In some embodiments, smoothing comprises heating (e.g. melting, softening, and/or consolidating) at least two or more bead depths into the metal shaped-preform.

Without being bound by a particular mechanism or theory, it is believed that the surface tension of the melted and/or softened material and/or potential gravitational effects thereof causes any undulations, ripples, and/or dips in the surface of the bead deposit attributable/characteristic of additive manufacturing to decrease in magnitude. The objective of this technique is to melt or soften only the surface of the deposit such that it does not significantly alter the overall shape/geometry of the deposit but removes or reduces localized irregularities in the surface.

In some embodiments, the smoothing step includes (in the case of a deposition of AM material via non-powder bed and/or wire based feeds): defocusing the energy source (e.g. the electron beam of the wire fed AM machine) from a first beam size (e.g. indicative of additive manufacturing) to a second beam size (e.g. indicative of smoothing); rastering the beam into a pattern; and moving over the surface and/or profile of the preform/part to affect smoothing of the surface.

In some embodiments, the size of the rastered beam is maintained over the surface of the part by maintaining the energy source at a set distance from the surface of the part and/or adjusting the amount of defocusing and/or pattern size as a function of the part geometry.

In other embodiments, energy sources include: lasers, arcs, and other energy sources are utilized (in lieu of the electron beam) in order to smooth the surface and/or profile of the preform.

As used herein, "rastering" (e.g. of a beam) means: moving and/or oscillating the beam in a pattern such that the effective "size" of the beam appears larger. a scan pattern (e.g. of the electron beam in an EBAM machine) in which an area is scanned (e.g. from side-to-side in lines, from top-to-bottom). As a non-limiting example, the rastered beam may look like a half inch in diameter whereas the non-rastered beam may be on the order of hundredths of an inch in diameter.

In some embodiments, the path that the rastered beam follows around the part is called the scan path. For additive manufacturing processes utilizing a wire-based feed, the scan path results in the characteristic raised ridges, undulations, and/or surface features perceived/visually observable in the metal shaped preform (e.g. the as built, non-smoothed part).

In some embodiments, the smoothing step is sufficient to provide a surface with a smoothness configured to undergo further working/processing (e.g. forging, ring rolling, extrusion, etc).

In some embodiments, the smoothing step is sufficient to provide a surface with a smoothness configured to undergo further working/processing (e.g. forging, ring rolling, extrusion, etc) without undue machining of the final worked (e.g. forged) product.

In some embodiments, the smoothing step is sufficient to provide a surface with a smoothness configured to undergo further working/processing (e.g. forging, ring rolling, extrusion, etc) without undue machining of the metal shaped-preform prior to further working/processing.

In some embodiments, the smoothing step is sufficient to provide a surface with a smoothness configured to undergo further working/processing (e.g. forging, ring rolling, extrusion, etc) without an undue rejection rate due to defects attributable to additive manufacturing deposition layers.

In some embodiments, the smoothing step is sufficient to reduce the surface roughness of the metal shaped-preform.

In some embodiments, the smoothing step is sufficient to reduce the oscillating surface morphology of an additively manufactured preform via the characteristic ridges interspaced with valleys (e.g. indicative of the pattern of bead deposition/feed path) of a wire-based additive manufacturing technology.

In some embodiments, the smoothing step is configured to prevent, reduce, and/or eliminate defects (e.g. non-smooth features on the deposits) from the final worked (e.g. forged) product. In some embodiments, the workable perform has a surface and/or profile that is sufficient to prevent, reduce, and/or eliminate folds, cavities, and/or other undesirable features in the final forged product/final worked product.

In some embodiments, the smoothing step is attributed to an improved manufacturing yield.

In some embodiments, the smoothing step is attributed to improved mechanical properties in the final worked products. In some embodiments, the smoothing step is attributed to reducing undulations in the surface of the deposit, e.g. which can have an improved/enhanced uniformity of the strain achieved in the worked (forged) component.

In some embodiments, after the smoothing step, the method comprises ultrasonically inspecting the smoothed additive manufacturing perform prior to forging (e.g. and if rejected, remove the part from the production/manufacturing pathway).

In some embodiments, after the smoothing step, the surface is configured for ultrasonic inspection, enabling identification of defects to be reworked. In this embodiment, the smoothing step is followed by an ultrasonically inspecting/detecting step to identify any defects in the metal shaped-preform. If, in this embodiment, one or more defects are identified via ultrasonic inspection, the method further comprises a reworking and/or second smoothing step (e.g. configured to penetrate to a sufficient level to address and ameliorate the detected defect).

In some embodiments, the smoothing step is sufficient to provide a surface capable of ultrasonic inspection without prior machining.

In some embodiments, after the smoothing step, the preform has an improved configuration for x-ray inspection, enabling identification of defects to be reworked. In this embodiment, the smoothing step is followed by an x-ray inspecting/detecting step, configured to identify any defects in the metal shaped-preform. If, in this embodiment, one or more defects are identified via x-ray inspection, the method further comprises a reworking and/or second smoothing step (e.g. configured to penetrate to a sufficient level to address and ameliorate the detected defect).

In some embodiments, the smoothing step is sufficient to reduce stress concentrations in the final part (e.g. in instances where the entire surface of the final worked product is not machined).

Without being bound by a particular mechanism or theory, it is believed that the smoothing step melts an upper portion of the part such that the raised ridges on the surface (indicative of an additively manufactured part) are reduced in overall height to provide for a smoothed surface.

Example—Making a Workable Preform 1

Figure 18A:
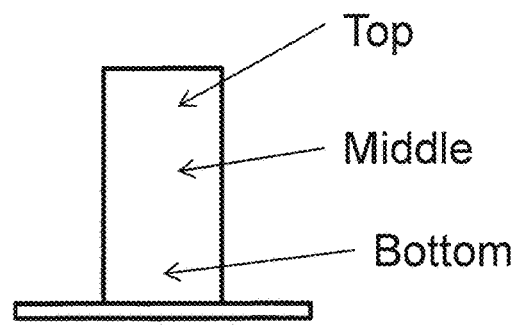

Five cylinders were additively manufactured from Ti-6Al-4V using electron beam additive manufacturing (Sciaky). Build parameters were varied and one of the cylinders was surface smoothed using ebeam smoothing. The build parameters are outlined in Table 1, while the final part dimensions are outlined in Table 2 (below). The experimental results are provided in FIG. 17-19, which include photographs of the cylinders and a chart depicting surface roughness.

TABLE 1

Build Parameters for Each Cylinder

| Cylinder | Wire Diameter (in) | Deposition Rate (lbs per hr) | Accelerating Voltage (kV) | Nominal Beam Current (mA) | Surface Travel Speed (IPM) | Wire Feed rate (IPM) | Target Pool Width (in) |
|---|---|---|---|---|---|---|---|
| 1 | 0.125 | 15 | 40 | 215 | 30 | 127.3 | 0.47 |
| 2 | 0.125 | 7.5 | 40 | 108 | 15 | 63.7 | 0.47 |
| 3 | 0.045 | 1 | 25 | 85 | 30 | 60 | 0.2 |
| 4 | 0.125 | 7.5 | 40 | 108 | 15 | 63.7 | 0.47 |
| 5 | 0.045 | 1 | 25 | 85 | 30 | 60 | 0.2 |

TABLE 2

Dimensions of the Cylinders

| Cylinder No. | ID, in. | OD, in. | Wall thickness, in. | Height, in. |
|---|---|---|---|---|
| 1 | 4.85 | 5.9 | 0.525 | 5.8 |
| 2 | 5.0 | 5.8 | 0.4 | 8.2 |
| 3 | 5.5 | 5.9 | 0.2 | 7.5 |
| 4 | 5.0 | 5.8 | 0.4 | 7.1 |
| 5 | 4.9 | 5.3 | 0.2 | 7.5 |

Cylinders 3 and 5 used the same build parameters, with a wire diameter of 0.045". Cylinder 5 was utilized to demonstrate steps in thickness. While Cylinders 2 and 4 had the same build parameters, it is noted that after building, Cylinder 4 was smoothed with the electron beam according to the following process.

FIG. 17 provides a series of perspective side view photographs of the 5 cylinders. It is visually apparent that there are surface ridges in the as-manufactured metal shaped preforms (without smoothing), i.e. Cylinders 1-3 and 5. Moreover, there are visually observable differences in the surface/profile of cylinders having different diameters of wire feedstock (e.g. depth of ridges, distance of ridges, indicative of the feedstock, deposition rate, and/or other AM parameters.

Figure 18B:
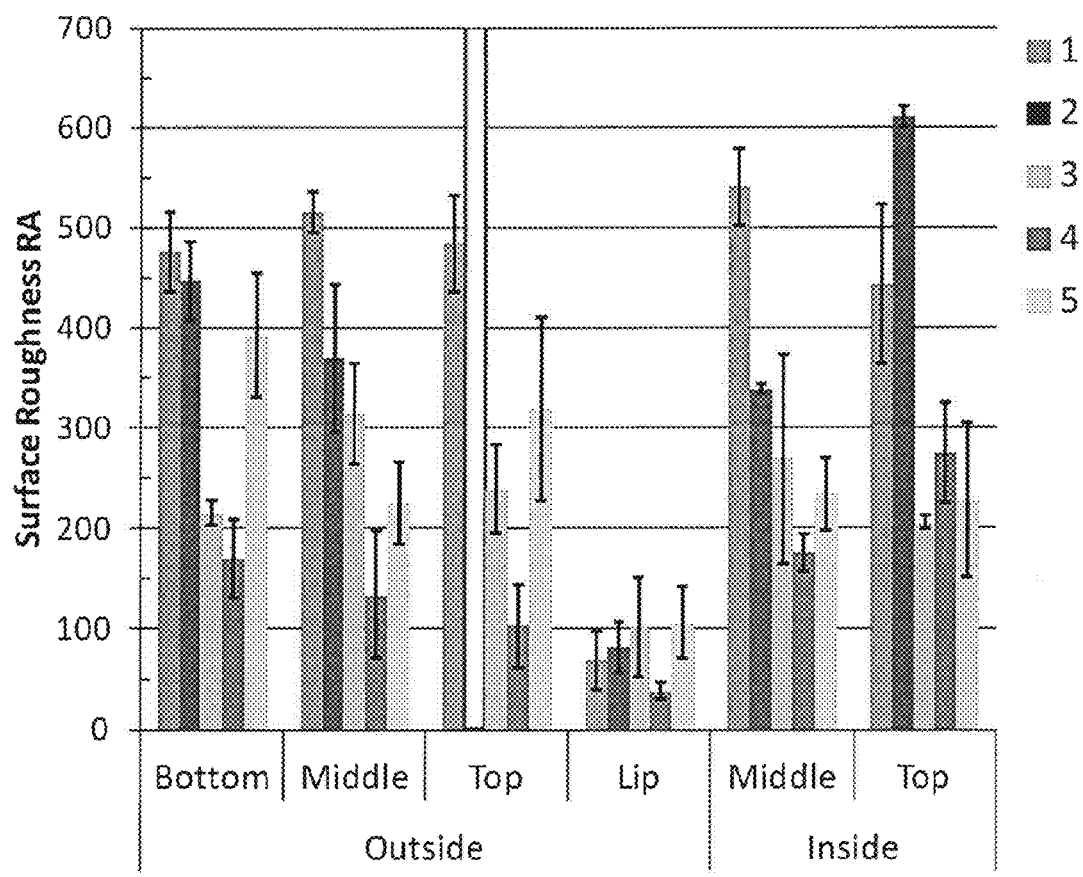

FIG. 18B depicts the measured surface roughness for each of the cylinders (where 18A depicts the relative positioning for each of the measurements along the cylinders). For each of the 5 cylinders, surface roughness was characterized along three different areas/portions of the component (i.e. top, middle, and bottom along the inner diameter and outer diameter of the cylinder, where the bottom was configured adjacent to the build substrate). Referring to the graph of FIG. 18B, Cylinder 4 had the lowest surface roughness for each measured parameter, even though Cylinder 4 was constructed of a larger diameter wire feedstock than Cylinders 3 and 5. Also, in comparing the three positions along the cylinders that were measured (top, middle, bottom), generally the lowest RA values were located along the lip (e.g. top) of the cylinders, as compared to the middle and bottom of the cylinders. Further, it is noted that Cylinders 3 and 5 had a generally lower surface roughness than Cylinders 1 and 2, as 3 and 5 had a smaller diameter wire feed stock.

Figure 19:
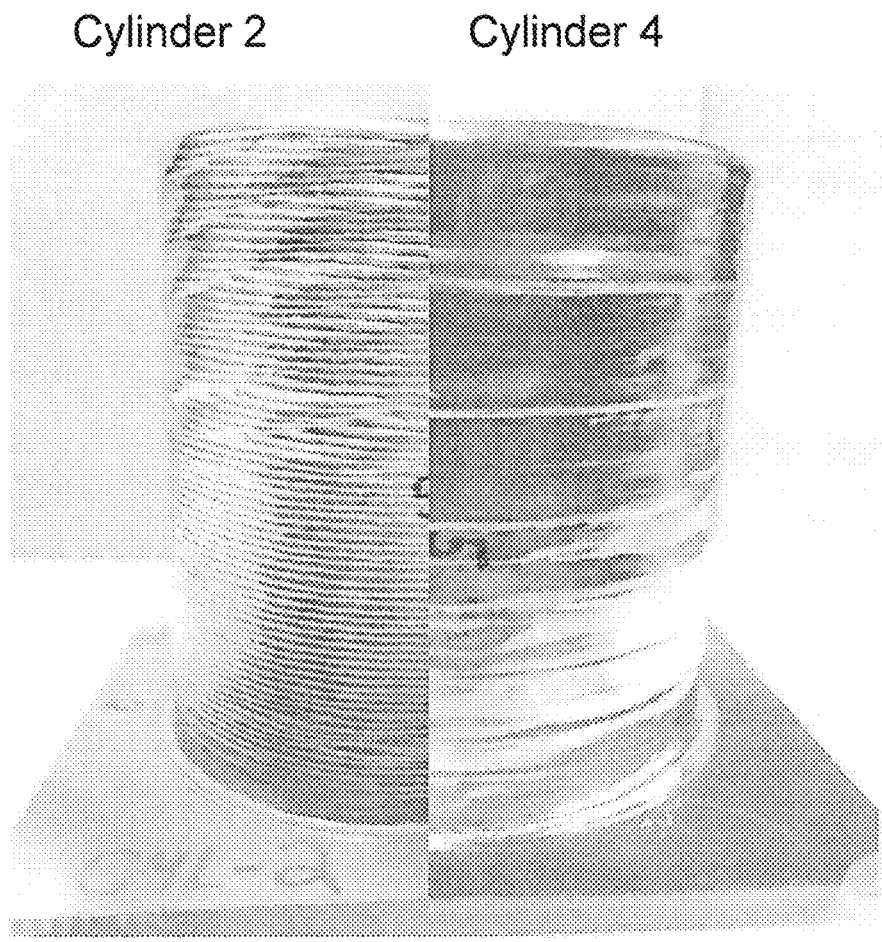

FIG. 19 depicts a cut away side view contrasting the characteristic ridges via the metal shaped-preform of Cylinder 2 (as-made) vs. Cylinder 4, the smoothed surface of a forgeable preform (e.g. workable preform) in accordance with the instant disclosure. Although both cylinders had the same build parameters, the smoothing step reduced the surface roughness of Cylinder 4, to promote a workable preform (e.g. forgeable preform).

Example—Making a Workable Preform 2

A part was additively manufactured utilizing an Electron Beam Additive Manufacturing (EBAM) system (Sciaky). The feedstock was a wire of Ti-6Al-4V. Wire was deposited in a layer-by-layer additive method on the substrate plate to create a metal shaped preform. The substrate plate dimensions were approximately 12"×12"×¾".

Once the metal shaped preform was built, the electron beam of the additive machine was changed from a deposit mode to a smoothing mode. (No additional feedstock/wire was added to the molten pool and thus no additional material is deposited on the part.) During smoothing, the electron beam was defocused, rastered, and moved quickly over the surface of the part at a decreased beam current (e.g., as compared to that used in a standard deposit) to affect smoothing of the surface.

During smoothing, a low power, defocused electron beam was rastered over/moved across the surface of the deposited material in a concentric bulls-eye ring pattern of varying sizes. In some embodiments, the resulting rastered beam spanned multiple (at least two) deposition paths (e.g. defined by a bead size). In some embodiments, the resulting rastered beam is the same size as the "build"/deposition beam. In some embodiments, the resulting rastered beam is smaller than the build/deposition beam. The beam in turn caused localized surface heating (e.g. melting and/or softening) which allowed the ridged material (indicative of the various paths of bead deposition) to flow towards the valleys and reduce the overall surface waviness/characteristics of at least a portion (e.g. treated portion) of the perform.

More specifically, in comparing the beam parameters for the building step vs. the smoothing step, for the smoothing step, the beam current (mA) was reduced by approximately half of that in build mode; the travel speed (inches/min) was increased by a little over three times that of the build mode; and the pattern "size" (unitless) was increased from the build mode by a little over 1.5 times.

It is noted that the same beam pattern was utilized in both the AM building step and the smoothing step. The scan path (i.e. the path that the energy source travels along) for the standard deposit (building) was completed in a series of parallel lines, while the smoothing pass roughly followed the profile of the part, starting from the center of the part and generally circling outwards (e.g. where the last circle effectively traces the outside of the deposit). The "Pattern Size" variable is simply a scaling factor that allows the increase or decrease of the size of the pattern that is projected on the part. The size of the pattern is variable, based on the initial roughness/waviness of the part, etc. The parameters of the energy source (electron beam) are generally interdependent, such that if one variable is modified, the others are also modified accordingly.

Figure 20:
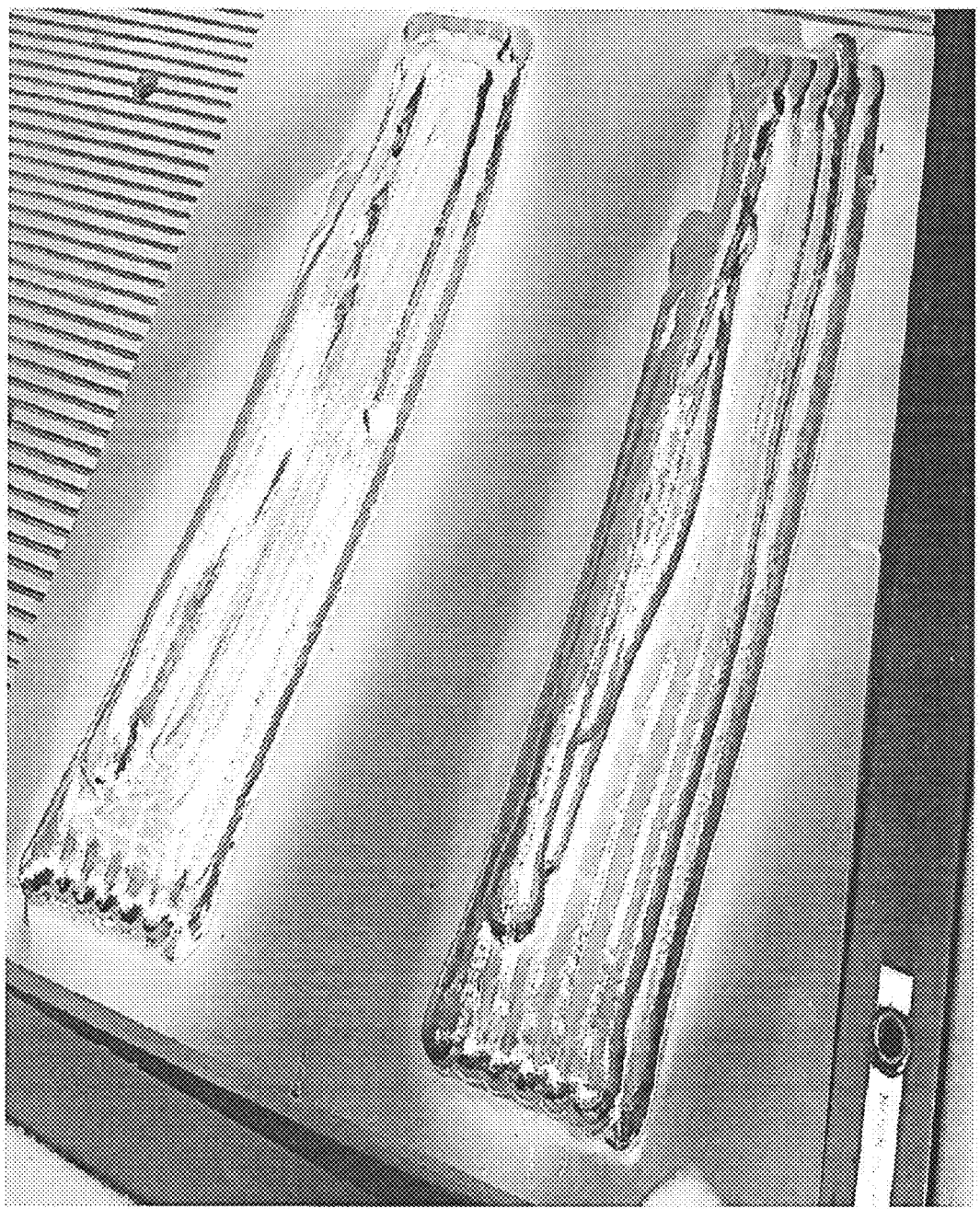
FIG. 20 depicts a side-by-side comparison of an as-made preform compared to an embodiment of a smoothed preform, smoothed in accordance with one or more methods of the instant disclosure.

FIG. 20 provides a comparison of two different components, contrasting the as built (before smoothing) and the workable perform (after smoothing). More specifically, the photograph on the right is of an as built AM perform that has not undergone EBAM smoothing, while in contrast the photograph on the left is of an AM perform that has undergone EBAM smoothing (e.g. to smooth the ridges characteristic of the deposition pathways along the profile of the perform).

Example: Forging a Forgeable Preform

A metal preform (titanium or otherwise) is produced using the selected additive manufacturing method (e.g. electron beam additive manufacturing (EBAM), wire arc additive manufacturing (WAAM), or other metal deposition or extrusion additive process).

With the proper smoothing (e.g. via a energy source), the metal shaped preform is configured with a surface (e.g. reduced ridges, and/or lower surface roughness as compared to a non-smoothed AM surface with the same build parameters) and/or profile (e.g. appropriately filled corners and edges) sufficient to perform a forging operation. With the metal shaped-preform configured as a forgeable preform, additional processing steps (including but not limited to) mechanical grinding and/or chipping operations are reduced, prevented, and/or eliminated.

This AM produced preform will be the starting stock or blocker for the forging operation. The preform is configured to be placed into the forging die (and forged) without further rework. Once prepared, the forgeable preform is placed in a furnace to heat it to the appropriate forging temperature. The forging dies will also be heated to the appropriate temperature for forging. The temperature for both of metal preform (forgeable metal preform) and the forging die are dependent on the type of metal and the geometry (e.g. determined prior to the forging operation).

With the dies at the appropriate temperature and the preforms at the appropriate temperature, the preforms will be removed from the furnace and placed within the forging die. The forging dies are then compressed together forcing the metal in the preform to redistribute and fill the die cavity. This forging action can occur in a single pressing operation. It may also be accomplished through multiple pressing operations (or blows) until the die impression is filled.

The process includes heating a prepared preform, forging in the dies, and then the part is then removed from the die and (in some embodiments) is set aside for subsequent operations required for the specific part. These subsequent operations could include (as non-limiting examples): placing back into the furnace for a subsequent forging operation or allowing the part to cool for preparation for other forging steps or thermal operations like heat treating, annealing, and/or aging. In some embodiments, the subsequent operations include rework operations. The cycle of placing a preform in the furnace, heating to the desired temperature, placing in the die for forging, forging to the desired geometry for that step and then removing from the die is considered a forging step. A single step forging would be defined as heating and forging the material in a single press with multiple blows. A multiple step forging would be defined as repeating the forging step multiple times.

In some embodiments, the final forged product is configured with an amount (e.g., a pre-selected amount) of true strain due to the contacting step 220. In some embodiments, the strain realized by the final forged product may be non-uniform throughout the final forged product due to, for example, the shape of the forging dies and/or the shape of the metal shaped-preform. Thus, the final forged product may realize areas of low and/or high strain. Accordingly, the building substrate may be located in a predetermined area of the metal shaped-preform such that after the forging, the building substrate is located in a predetermined area of low strain of the final forged product. In some embodiments (e.g. when the substrates are wrought), the substrates are configured to achieve the desired properties without additional strain. In some embodiments, an area of low strain is predetermined based on predictive modeling and/or empirical testing. In some embodiments, based on modeling, the strain distribution within the final forging is predicted. In some embodiments, through design and analysis of the metal shaped-preform, the desired amount of strain in the final forging is pre-determined. In some embodiments, the pre-determined amount of strain is utilized/configured such that the final forged component achieves the desired properties. As such, the substrate is configured/located in an area outside of the final component in the forging such that work is not required in that region.

Figure 6:
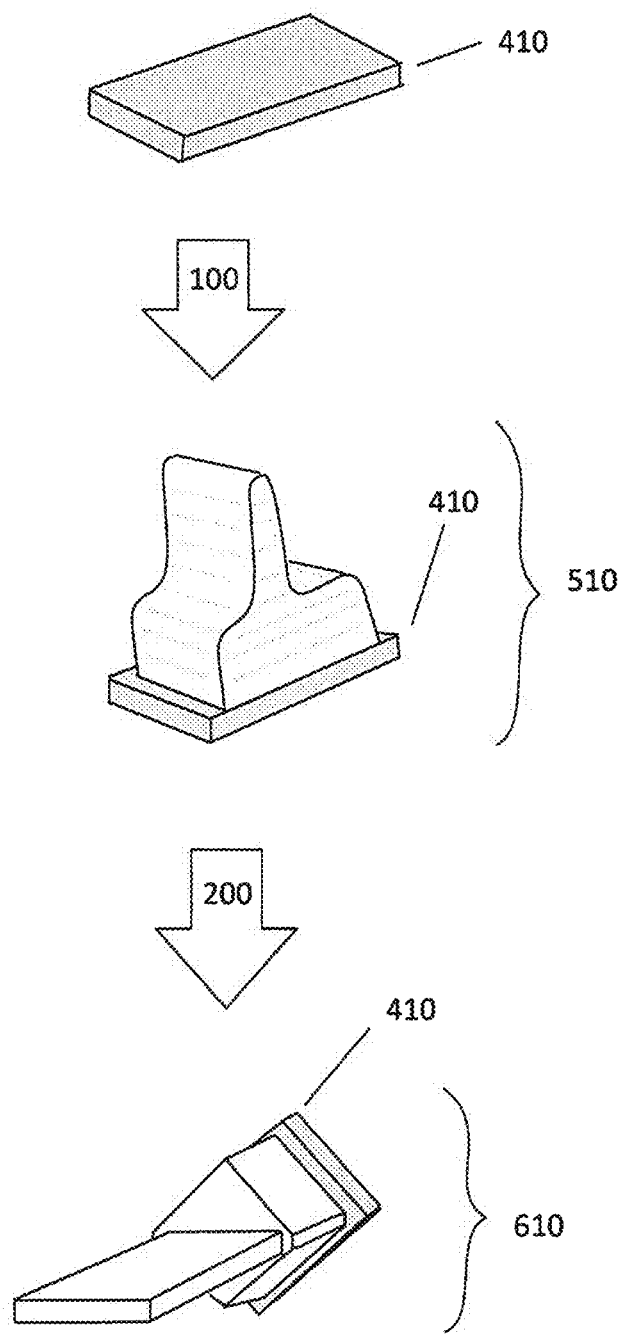
FIG. 6 is a schematic illustration of another embodiment of a method of producing a final forged product, wherein the final forged product includes an integral building substrate, in accordance with the instant disclosure.

Referring now to FIG. 6, another embodiment of incorporating a building substrate (410) into a metal shaped-preform (510) is shown. In the illustrated embodiment, material is added to the building substrate (410) via additive manufacturing (100) to produce the metal shaped-preform (510). In this embodiment, the metal shaped-preform (510) is forged (200) into a final forged product (610). In this embodiment, the final forged product (610) includes the building substrate (410) as an integral piece. In another embodiment, the metal shaped-preform is removed from the building substrate prior to the forging step.

In some embodiments, the building substrate is configured with a predetermined shape and/or predetermined mechanical properties (e.g., strength, toughness to name a few). In one embodiment, the building substrate is a pre-wrought base plate. In one embodiment, the shape of the building substrate is predetermined based on the shape of the area of low strain. In one embodiment, the mechanical properties of the building substrate are predetermined based on the average true strain realized by the metal shaped-preform and/or the true strain realized within the area of low strain. In one embodiment, two or more building substrates are incorporated into a metal-shaped preform. In one embodiment, the building substrate comprises a pre-wrought base plate. In one embodiment, the building substrate was produced using an additive manufacturing process. In one embodiment, multiple metal shaped-preforms are built upon the same build substrate and separated after the additive manufacturing step and prior to the forging step.

In some embodiments, the building substrate is configured/made from any metal suited for both additive manufacturing and forging, including, for example metals or alloys of titanium, aluminum, nickel (e.g., INCONEL), steel, titanium aluminide, and stainless steel, among others. In one embodiment, the building substrate is made of the same material(s) as the rest of the metal-shaped preform. In one embodiment, the material added to the metal shaped preform is a first material, whereas the building substrate is made of a second material (where the second material is different from the first material). In one embodiment, the first material is configured with a first strength and the second material is configured with a second strength. In one embodiment, the first material has a first fatigue property and the second material has a second fatigue property. In some embodiments, the first material is different form than the second material (e.g. powder on plate, wire on plate, etc.)

In one example, the building substrate is a first ring of a first material. A second material is added, via additive manufacturing, to the ring thereby forming a second ring of the second material, integral with the first ring. Thus, a ring-shaped metal shaped-preform comprising two different materials is produced. In this example, the ring-shaped metal shaped-preform is then forged into a ring-shaped final forged product comprising two different materials.

In one embodiment, one or more engine containment rings (e.g., one or more aerospace engine containment rings) is formed by the method described above. For example, the building substrate includes a first ring of a material which realizes high toughness. Then, a second ring of a second material which realizes high strength is added, via additive manufacturing, to the first ring thereby forming a metal shaped-preform. In this embodiment, the metal shaped-preform is then forged into an engine containment ring having an inner ring of high toughness and outer ring of high strength.

In some embodiments, additive manufacturing is utilized to produce gradient materials. In this embodiment, the resultant metal shaped-preform comprises a gradient structure achieved through the additive manufacturing process by varying the composition of the additive feedstock and/or the process parameters during deposition of the metal shaped-preform.

Example 1—Ti-6Al-4V

Figure 3:
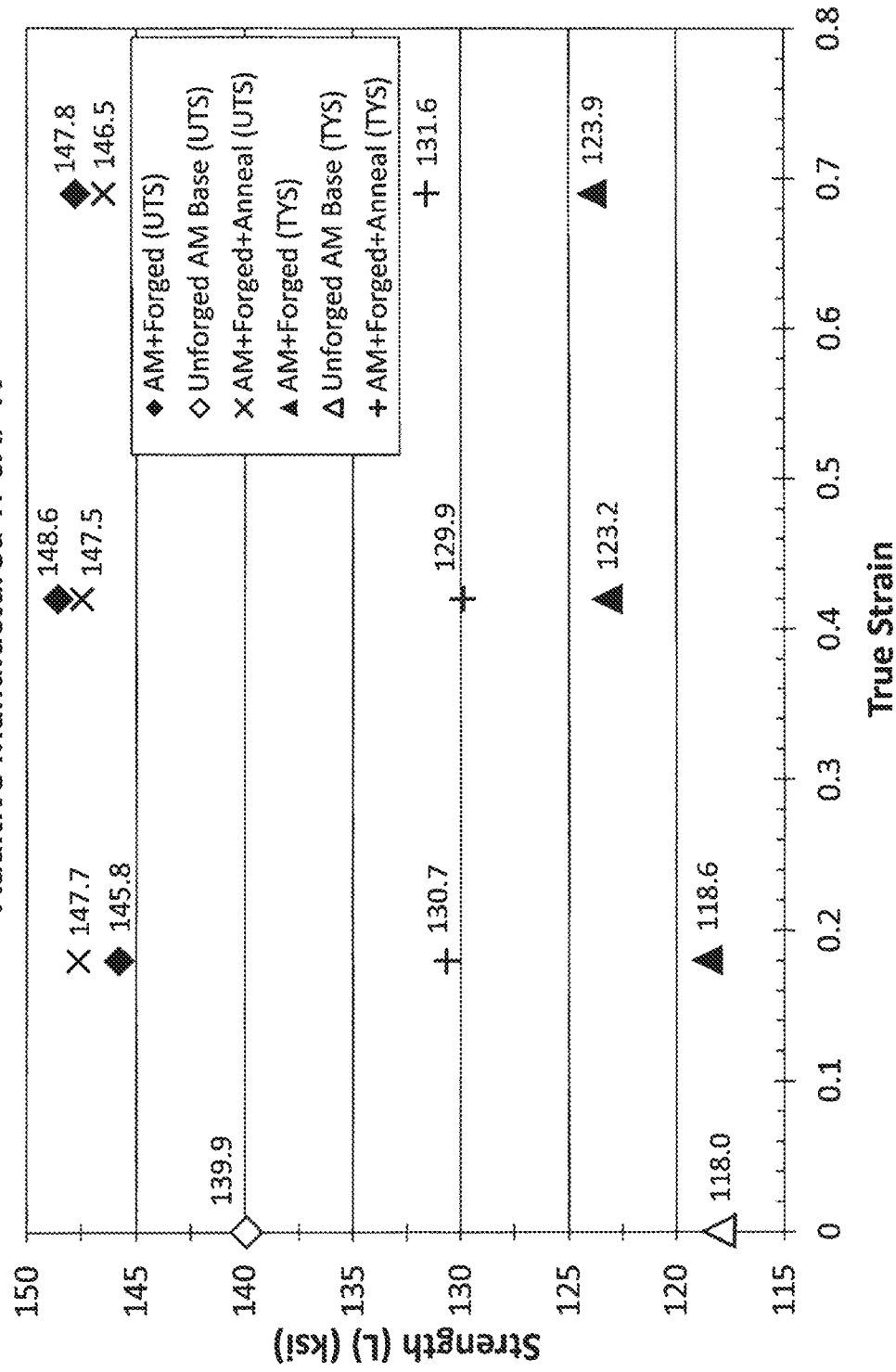
FIGS. 3-4 are charts illustrating data of Example 1, in accordance with the instant disclosure.
Figure 4:
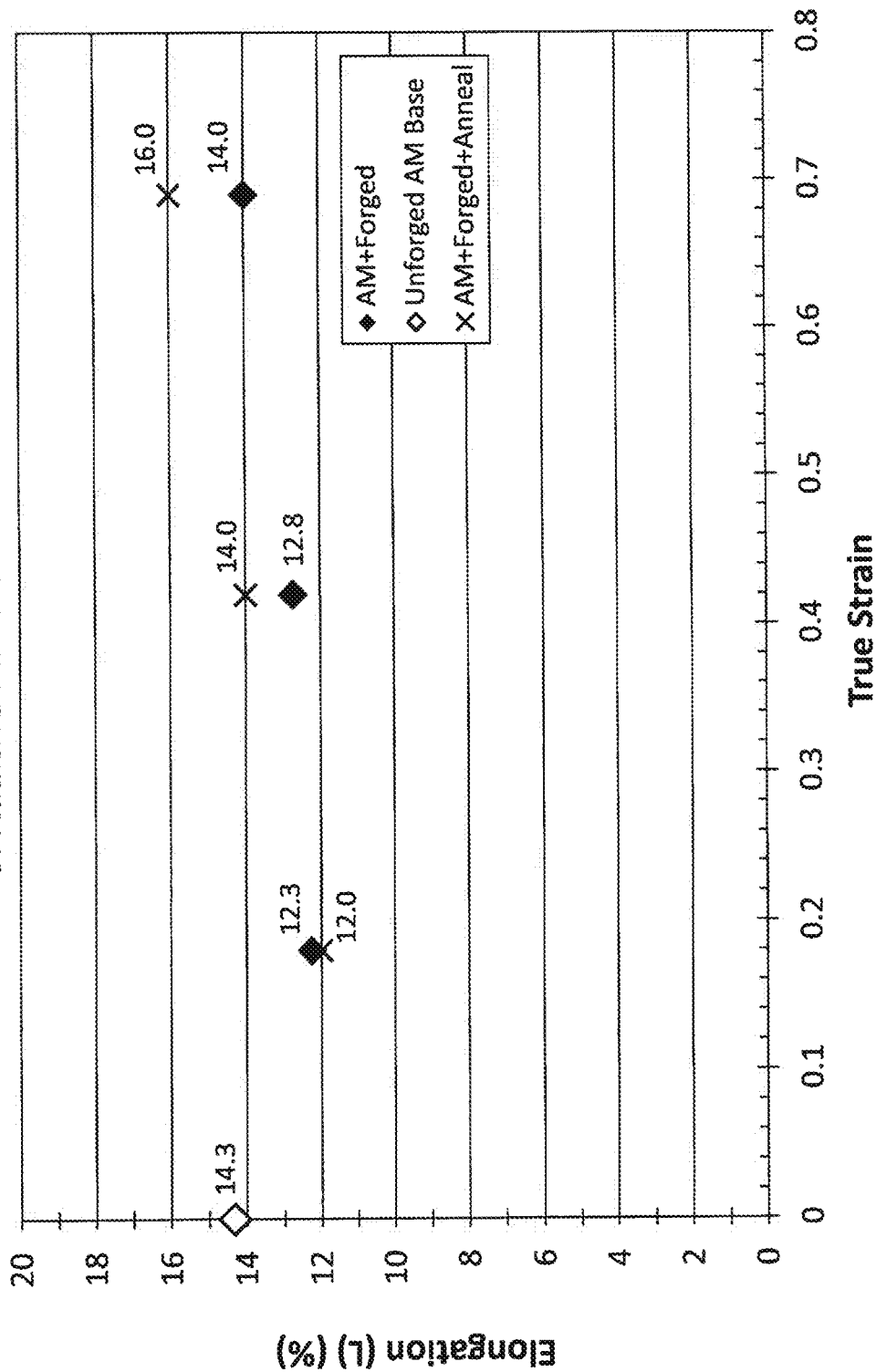

Several Ti-6Al-4V preforms are produced via additive manufacturing. Specifically cylindrical Ti-6Al-4V preforms were produced via an EOSINT M 280 Direct Metal Laser Sintering (DMLS) additive manufacturing system, available from EOS GmbH (Robert-Stirling-Ring 1, 82152 Krailling/Munich, Germany). The Ti-6Al-4V preforms were produced in accordance with the manufacturer's standard recommended operating conditions for titanium. The preforms were then heated to a stock temperature of about 958° C. (1756° F.) or about 972° C. (1782° F.). Next, some of the cylindrical preforms were forged under various amounts of true strain and using a die temperature of about 390° C.-400° C. (734° F.-752° F.) to produce cylindrical final forged products. The true strain was applied to the cylindrical preforms in a direction parallel to the axis of the cylinders. The remaining preforms were left unforged. Some of the final forged products were then annealed at a temperature of about 732° C. (1350° F.) for approximately two hours to produce annealed final forged products. Mechanical properties of the unforged preforms, the final forged products, and the annealed final forged products were then tested, including tensile yield strength (TYS), ultimate tensile strength (UTS) and elongation, all in the L direction, the results of which are shown in FIGS. 3-4. For each level of strain, several samples were tested and the results were averaged. Mechanical properties, including TYS, UTS, and elongation were tested in accordance with ASTM E8.

As shown, the forged Ti-6Al-4V products achieved improved properties over the unforged Ti-6Al-4V preforms. Specifically, and with reference to FIG. 3, the forged Ti-6Al-4V products achieved improved ultimate tensile strength (UTS) over the unforged Ti-6Al-4V preforms. For example, the unforged Ti-6Al-4V preforms achieved a UTS of about 140 ksi. In contrast, the forged Ti-6Al-4V products achieved improved ultimate tensile strength, realizing a UTS of about 149 ksi after being forged to a true strain of about 0.4. Furthermore, and as shown in FIG. 3, the forged Ti-6Al-4V products achieved improved tensile yield strength (TYS) over the unforged Ti-6Al-4V preforms. For example, the unforged Ti-6Al-4V preforms achieved a TYS of about 118 ksi. In contrast, the forged Ti-6Al-4V products achieved improved tensile yield strength, realizing a TYS of about 123 ksi after being forged to a true strain of about 0.4. As shown in FIG. 4, the forged Ti-6Al-4V products achieved good elongation, all achieving an elongation of above 12% after being forged.

Furthermore, the annealed final forged products achieved improved properties over the final forged products which were not annealed. Specifically, and with reference to FIG. 3, the annealed final forged products achieved improved tensile yield strength (TYS) over the non-annealed final forged products. For example the annealed final forged products which were forged to a true strain of about 0.2 achieved a TYS approximately 10% higher than the final forged products which were not annealed. Furthermore, and as shown in FIG. 3, the annealed final forged products achieved similar ultimate tensile strength (UTS) to the non-annealed final forged products. Thus, annealing the final forged products increased TYS without sacrificing UTS. As shown in FIG. 4, the annealed final forged products achieved improved elongation compared to the non-annealed final forged products.

Figure 7:
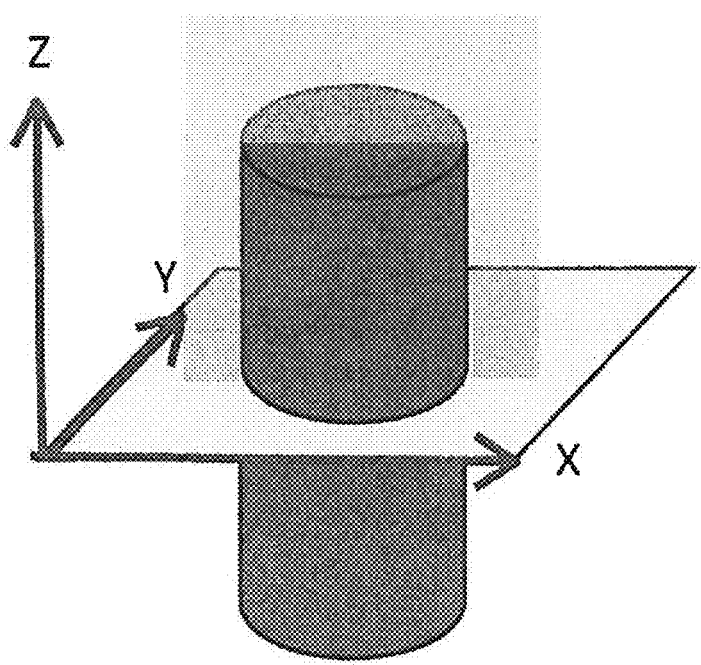
FIG. 7 is an illustration showing the transverse orientation and longitudinal orientations of a cylindrical preform, in accordance with the instant disclosure.
Figure 8:
FIG. 8 is a micrograph of one embodiment of an as-built Ti-6Al-4V metal shaped-preform, taken in the transverse direction, in accordance with the instant disclosure.
Figure 9:
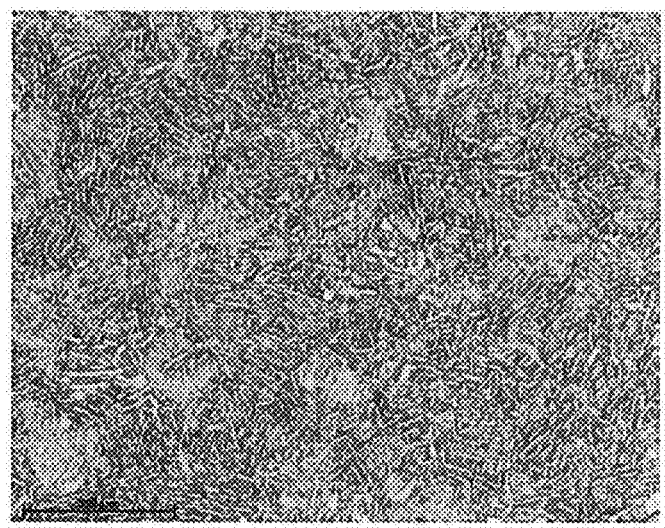
FIG. 9 is a micrograph of one embodiment of a preheated Ti-6Al-4V metal shaped-preform, taken in the transverse direction, in accordance with the instant disclosure.
Figure 10:
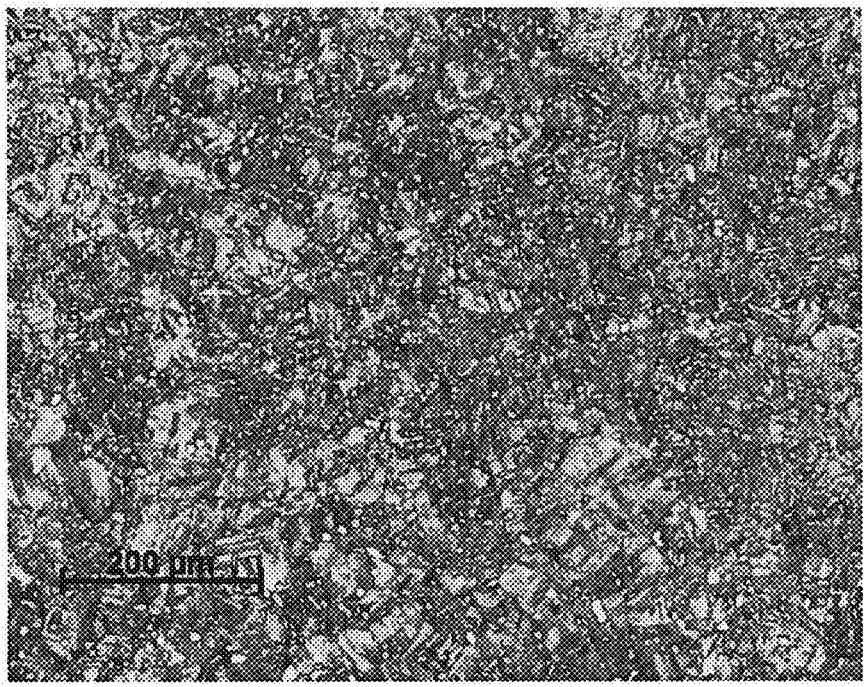
FIG. 10 is a micrograph of one embodiment of a Ti-6Al-4V final forged product, taken in the transverse direction, in accordance with the instant disclosure.
Figure 11:
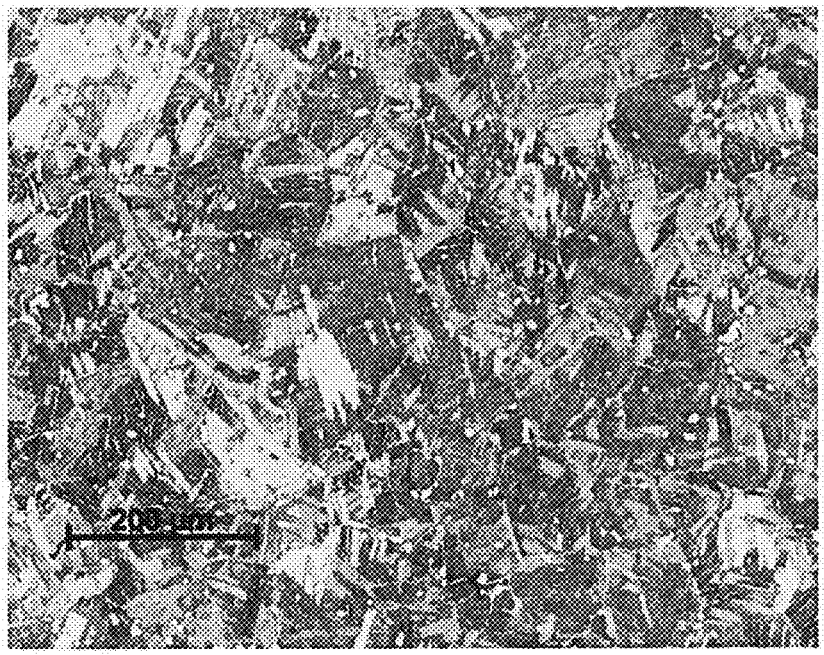
FIG. 11 is a micrograph of one embodiment of an annealed Ti-6Al-4V final forged product, taken in the transverse direction, in accordance with the instant disclosure.
Figure 12:
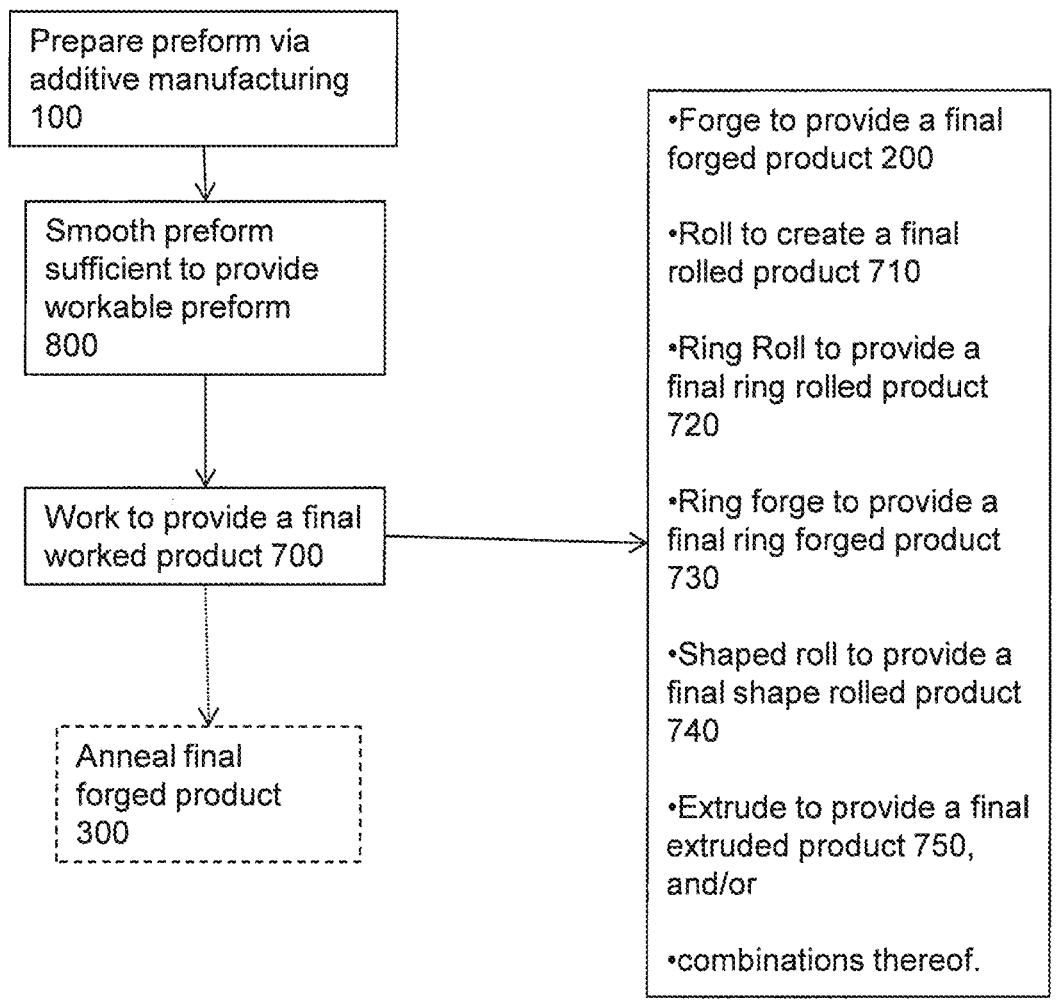
FIG. 12 is a flow chart depicting an embodiment of a method in accordance with the instant disclosure, in accordance with the instant disclosure.
Figure 13:
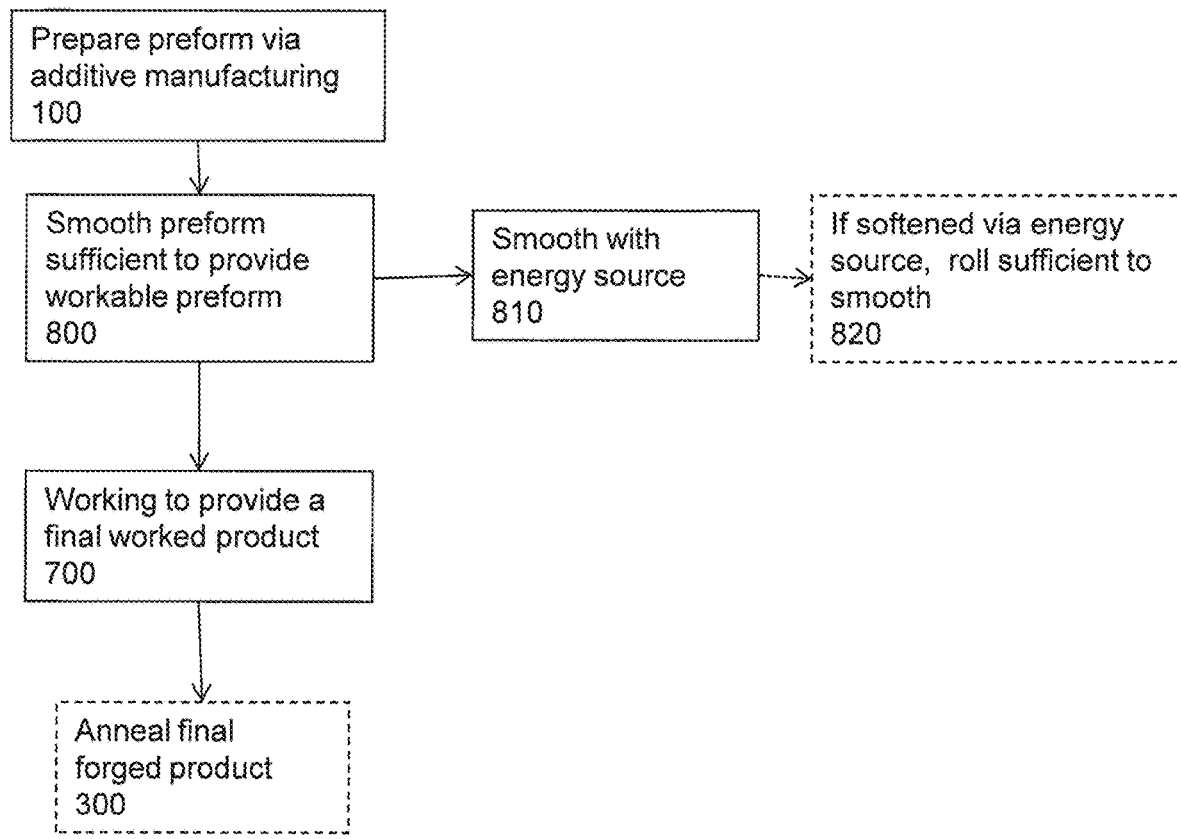
FIG. 13 depicts a flow chart depicting another embodiment of a method in accordance with the instant disclosure, in accordance with the instant disclosure.
Figure 14:
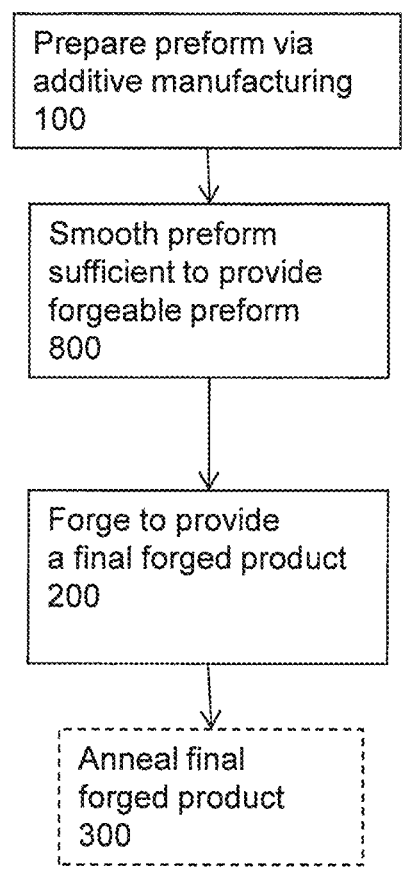
FIG. 14 depicts a flow chart depicting another embodiment of a method in accordance with the instant disclosure, in accordance with the instant disclosure.
Figure 15A:
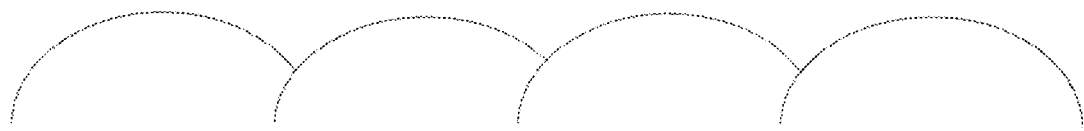
FIG. 15 depicts variations on surface topography, illustrating in 15A: a cut away side view of an as-made metal shaped preform (no smoothing); 15B: a smoothed surface providing for reduced surface roughness and/or reduced ratio of valley depth to valley height; 15C: a smoothed surface providing for a greater reduction in surface roughness and ratio of depth to height as compared to 15A or 15B (smoothed) and 15D: an even greater smoothed surface, providing an improved surface roughness and/or ratio of valley depth to height as compared to any of the other iterations (as-made or smoothed) in FIG. 15 in accordance with one or more embodiments of the instant disclosure.
Figure 15B:
Figure 15C:
Figure 15D:
Figure 16A:
FIG. 16 depicts variations on surface topography, illustrating in 16A: a cut away side view of an as-made metal shaped preform (no smoothing); 16B: a smoothed surface providing for reduced surface roughness and/or reduced ratio of valley depth to valley height; 16C: a smoothed surface providing for a greater reduction in surface roughness and ratio of depth to height as compared to 16A or 16B (smoothed) and 16D: an even greater smoothed surface, providing an improved surface roughness and/or ratio of valley depth to height as compared to any of the other iterations (as-made or smoothed) in FIG. 16, in accordance with one or more embodiments of the instant disclosure.
Figure 16B:
Figure 16C:
Figure 16D:

FIGS. 8-11 are micrographs showing the microstructures of the cylindrical preforms and cylindrical final forged products of Example 1. All of the micrographs were taken in the transverse orientation and at the midpoint of the cylinder. Referring now to FIG. 7, one embodiment of a cylindrical final forged product is illustrated. In the illustrated embodiment, the final forged product has been forged in the Z direction. The X-Y plane shown in FIG. 7 is the transverse orientation and the X-Z plane is the longitudinal orientation. Referring back to FIG. 8, a micrograph of a Ti-6Al-4V preform produced via additive manufacturing is shown. As can be seen in FIG. 8, the microstructure consists of transformed beta phase material with evidence of the prior beta phase grains. FIG. 9 is a micrograph of a additively manufactured Ti-6Al-4V preform that has been preheated to a temperature of about 1750° F. As can be seen in FIG. 9, the microstructure after heating is transformed beta phase material with the formation and growth of acicular alpha phase material. No primary alpha phase material is observed. FIG. 10 is a micrograph of an additively manufactured Ti-6Al-4V preform that has been preheated to a temperature of about 1750° F. and then forged to true strain of about 0.7 (e.g., a final forged product). As can be seen in FIG. 10 the preheating and forging steps result in a more refined grain structure, punctuated by the nucleation of primary alpha phase grains interspersed in the matrix. These interspersed primary alpha phase grains are observed as the small, white, circular dots. FIG. 11 is a micrograph of an additively manufactured Ti-6Al-4V preform that has been preheated to a temperature of about 1750° F., then forged to true strain of about 0.7, and then annealed at a temperature of about 1350° F. (e.g., an annealed final forged product). As can be seen in FIG. 11, in addition to the small, circular grains of primary alpha phase material interspersed in the matrix, primary grains of alpha phase material have formed as well.

While various embodiments of the present disclosure have been described in detail, it is apparent that modification and adaptations of those embodiments will occur to those skilled in the art. However, it is to be expressly understood that such modifications and adaptations are within the spirit and scope of the present disclosure.

What is claimed is:
1. A method, comprising:
   a. using additive manufacturing to produce a metal shaped preform, wherein the metal shaped perform comprises a plurality of undulations on a surface of the metal shaped preform indicative of an additive manufacturing build;
   b. smoothing the plurality of undulations on the surface of the metal shaped preform via an energy source sufficient to provide a workable preform configured for a further working operation;
      wherein the smoothing comprises at least one of: electron beam smoothing, flash lamp melting, laser melting, arc melting, and laser ablation; and
   wherein the smoothing comprises heating at least a portion of a single bead depth; and
   c. working the metal shaped preform to form a final forged product, wherein the working comprises heating the metal shaped preform to a stock temperature, wherein the stock temperature is a target temperature of the preform prior to forging in a range of from 850° C. to 978° C., and wherein the final forged product is a structural aerospace component.

2. The method of claim 1, wherein the metal shaped preform comprises smooth outer edges.

3. The method of claim 1, wherein the using step includes using a non-powder based additive manufacturing process to build the metal shaped perform.

4. The method of claim 1, wherein the smoothing step comprises using a first set of beam parameters to additively manufacture the metal shaped preform, followed by changing to a second set of beam parameters configured for smoothing, wherein a set of beam parameters comprises a plurality of beam variables.

5. The method of claim 4, wherein the beam variables include: beam size, beam current, travel speed, wire feed rate, beam pattern, scan path, and combinations thereof.

6. The method of claim 5, wherein the first set of beam parameters differ from the second set of beam parameters by a difference in at least one beam variable.

7. The method of claim 6, wherein the wire feed rate is 0 during smoothing.

8. The method of claim 1, comprising preheating a substrate with the energy source before the using step.

9. The method of claim 1, wherein the using step comprises additively manufacturing the metal shaped perform via a continuous build plan.

10. The method of claim 1, wherein the using step comprises additively manufacturing the metal shaped perform via a continuous exterior build plan.

11. The method of claim 1, wherein the energy source for the using step is the same energy source for the smoothing step.

12. The method of claim 1, wherein smoothing comprises, reducing a surface roughness of a measured portion of the surface of the metal shaped perform.

13. The method of claim 1, wherein the smoothing step comprises reducing a depth to width ratio of valleys along a measured portion of the surface of the metal shaped preform.

14. The method of claim 1, wherein the smoothing step comprises reducing a roughness along a measured portion of the metal shaped-preform, as detected with a blue light scan.

15. The method of claim 1, wherein the smoothing step comprises increasing a temperature of a surface portion of the metal shaped preform in order to promote melting of the surface portion.

16. The method of claim 1, wherein smoothing includes at least one of: melting, softening, and consolidating at least a portion of a deposited additive manufacturing path geometry in order to smooth the surface of the metal shaped preform.

17. The method of claim 1, wherein smoothing comprises heating at least a portion of an exterior surface of an additive manufacturing deposit with an energy source.

18. The method of claim 1, wherein smoothing comprises heating at least two or more bead depths into the metal shaped preform.

19. The method of claim 1, wherein the smoothing step comprises:
  defocusing the energy source from a first beam size of the energy source deployed in the using step to a second beam size for smoothing;
  rastering the beam into a pattern; and
  moving over the surface of the preform to affect smoothing of the surface.

* * * * *